US 8,033,589 B2

(12) United States Patent
Kusanagi et al.

(10) Patent No.: US 8,033,589 B2
(45) Date of Patent: Oct. 11, 2011

(54) VEHICLE SEAT

(75) Inventors: Hiroki Kusanagi, Kirishima (JP); Yoshiyuki Miura, Kariya (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 120 days.

(21) Appl. No.: 12/375,835

(22) PCT Filed: Apr. 18, 2007

(86) PCT No.: PCT/JP2007/058402
§ 371 (c)(1),
(2), (4) Date: Aug. 28, 2009

(87) PCT Pub. No.: WO2008/015824
PCT Pub. Date: Feb. 7, 2008

(65) Prior Publication Data
US 2010/0007165 A1    Jan. 14, 2010

(30) Foreign Application Priority Data

Aug. 1, 2006  (JP) .................................. 2006-210035
Aug. 1, 2006  (JP) .................................. 2006-210036

(51) Int. Cl.
*B60N 2/14* (2006.01)
(52) U.S. Cl. .................. 296/68.1; 296/65.07; 296/65.12; 296/65.15; 297/344.17; 297/344.24
(58) Field of Classification Search .............. 296/68.1, 296/65.07, 65.06, 65.08, 65.12, 65.11, 65.15, 296/65.18, 65.13, 65.14; 297/329, 330, 344.15, 297/344.17, 344.23, 344.24
See application file for complete search history.

(56) References Cited

U.S. PATENT DOCUMENTS

| 3,236,556 | A | * | 2/1966 | Lathers | 296/65.08 |
| 4,155,587 | A | * | 5/1979 | Mitchell | 296/65.12 |
| 4,802,706 | A | * | 2/1989 | Onimaru et al. | 296/68 |
| 4,846,529 | A | * | 7/1989 | Tulley | 297/344.23 |
| 5,524,952 | A | * | 6/1996 | Czech et al. | 296/65.12 |
| 5,630,638 | A | * | 5/1997 | Hirasawa et al. | 296/65.07 |
| 5,769,480 | A | * | 6/1998 | Gebhardt | 296/65.12 |
| 6,318,802 | B1 | * | 11/2001 | Sjostrom et al. | 297/344.1 |
| 6,467,849 | B1 | * | 10/2002 | Deptolla | 297/464 |
| 6,962,383 | B2 | * | 11/2005 | Takenoshita et al. | 296/65.03 |
| 7,316,441 | B2 | * | 1/2008 | Iwatani et al. | 296/65.12 |

(Continued)

FOREIGN PATENT DOCUMENTS

JP    2002-187468    7/2002

(Continued)

*Primary Examiner* — Jason S Morrow
(74) *Attorney, Agent, or Firm* — Patterson Thuente Christensen Pedersen P.A.

(57) ABSTRACT

A vehicle seat of the present invention has an engaged member, an engagement member and a guide portion. The engagement member is provided on the seat body so as to be movable between a restraint position and a restraint release position. The engagement member is capable of moving to the restraint position, so as to be advanced to a position in which the engagement member faces the engaged member, and is capable of moving to the restraint release position, so as to be retracted to a position in which the engagement member does not face the engaged member. The guide portion is capable of moving the engagement member to the restraint position when the seat body moves to the retracted position, and is capable of moving the engagement member to the restraint release position when the seat body is advanced from the retracted position.

3 Claims, 12 Drawing Sheets

U.S. PATENT DOCUMENTS

| | | | |
|---|---|---|---|
| 7,334,829 B2 * | 2/2008 | Fukui et al. | 296/65.11 |
| 7,399,035 B2 * | 7/2008 | Kusanagi et al. | 297/344.24 |
| 7,413,232 B1 * | 8/2008 | Fukui et al. | 296/65.09 |
| 7,438,339 B2 * | 10/2008 | Abraham | 296/65.09 |
| 7,789,447 B2 * | 9/2010 | Tomaiwa et al. | 296/65.11 |
| 7,845,703 B2 * | 12/2010 | Panzarella et al. | 296/65.11 |
| 7,850,242 B2 * | 12/2010 | Taguchi et al. | 297/344.24 |
| 2004/0124655 A1 * | 7/2004 | Takenoshita et al. | 296/65.13 |
| 2007/0222267 A1 * | 9/2007 | Tsujimoto et al. | 297/344.24 |
| 2011/0068599 A1 * | 3/2011 | Panzarella et al. | 296/65.11 |

FOREIGN PATENT DOCUMENTS

JP     2005-14672     1/2005

* cited by examiner

VEHICLE SEAT

TECHNICAL FIELD

The present invention relates to a vehicle seat having a rotation mechanism that is capable of rotating a seat body between a seating position in which the seat body faces a front side of a vehicle and a laterally facing position in which the seat body faces a door opening, and a slide and vertically moving mechanism that is capable of lowering the seat body toward vehicle exterior while the seat body is in the laterally facing position in which the seat body faces the door opening.

BACKGROUND ART

A technique regarding the vehicle seat described above is disclosed in Japanese Laid-Open Patent Publication No. 2005-14672.

As illustrated in FIG. 13, this vehicle seat has a seat body 101, and a longitudinal slide mechanism 102 that is disposed on a vehicle floor F and is capable of moving the seat body 101 in a longitudinal direction of the vehicle. Disposed on a slide base 102t of the slide mechanism 102 is a rotation mechanism 104 that is capable of rotating the seat body 101 between a seating position in which the seat body 101 faces the front side of the vehicle and a laterally facing position in which the seat body 101 faces the door opening. Also, disposed on a rotation base 105 of the rotation mechanism 104 are a first slide mechanism 106 that is capable of advancing or retracting the seat body 101 relative to the vehicle exterior while the seat body 101 is in the laterally facing position, and a vertically moving mechanism 107 that is capable of lowering and raising the seat body 101 as the seat body 101 is advanced or retracted by the first slide mechanism 106. Further, disposed on a vertically moving base (not shown) of the vertically moving mechanism 107 is a second slide mechanism (not shown) that is capable of advancing or retracting the seat body 101.

Attached to a side surface of the seat body 101 is a locking hook 101f that protrudes downward and then extends backward. Further, when the seat body 101 is returned to a retracted position by the second slide mechanism, the locking hook 101f is capable of being inserted into a horizontally extending hole-shaped slide engagement portion 107k of the vertically moving mechanism 107 from before thereof. The locking hook 101f and the slide engagement portion 107k are constructed so as to not obstruct advancing motion and retracting motion of the seat body 101 cause by the second slide mechanism and to engage each other when the seat body 101 is moved forwardly-upwardly by a seatbelt loading.

Also, a bracket 110 is vertically disposed on and fixed to a side surface of the slide base 102t of the longitudinal slide mechanism 102. The bracket 110 has a rotation locking hook 111 that is formed at an upper end thereof. Further, a rotation engagement portion 105k is provided on a side surface of the rotation base 105 at a position corresponding to the rotation locking hook 111. Further, when the rotation base 105 is returned to the seating position in which the rotation base 105 faces the front side of the vehicle, the rotation locking hook 111 is inserted into an opening formed in the rotation engagement portion 105k. The rotation locking hook 111 and the rotation engagement portion 105k are constructed so as to not obstruct rotational motion of the rotation base 105 and to engage each other when the seat body 101 is moved forwardly-upwardly by the seatbelt loading.

A slide engagement portion 114 is fixed to the vehicle floor F so as to extend along the longitudinal slide mechanism 102. Further, a slide locking hook 112 formed in a lower end of the bracket 110 is positioned directly below the slide engagement portion 114. The slide locking hook 112 and the slide engagement portion 114 are constructed so as to not obstruct longitudinal sliding motion of the slide base 102t, and are engaged with each other when the seat body 101 is moved forwardly-upwardly by the seatbelt loading.

Thus, when the seat body 101 is moved forwardly-upwardly by the seatbelt loading while the seat body 101 is in the seating position in which the seat body 101 faces the front side of the vehicle, the locking hook 101f of the seat body 101 and the slide engagement portion 107k of the vertically moving mechanism 107 engage each other, so that the seat body 101 is retained on the rotation base 105. Further, the rotation engagement portion 105k of the rotation base 105 engages the rotation locking hook 111 of the bracket 110. Further, the slide locking hook 112 of the bracket 110 engages the slide engagement portion 114 of the vehicle floor F. As a result, the seat body 101 is retained on the vehicle floor F.

DISCLOSURE OF THE INVENTION

Problem to be Solved by the Invention

However, in the vehicle seat 100 described above, when the seat body 101 is moved forwardly substantially horizontally with respect to the rotation base 105 by the seatbelt loading, the locking hook 101f of the seat body 101 and the slide engagement portion 107k of the vertically moving mechanism 107 do not engage each other. That is, a slide lock mechanism of the seat body with respect to the rotation base does not function.

Therefore, there is a need in the art to enable the slide lock mechanism to reliably function even when the seat body moves forwardly horizontally with respect to the rotation base by the seatbelt loading, and to prevent longitudinal sliding motion of the seat body from being obstructed without any special operation when the seat body is slid back and forth with respect to the rotation base.

SUMMARY OF THE INVENTION

A first invention provides a vehicle seat which includes a seat body, a rotation mechanism having a rotation base that is capable of rotating along a vehicle floor, a vertically moving mechanism having a first slide mechanism, a link mechanism and a guide mechanism, and a second slide mechanism that supports the seat body on the other end of said link mechanism so as to be capable of being advanced and retracted. The first slide mechanism is disposed on said rotation base and having a slide base that is capable of being advanced or retracted. One end of the link mechanism is vertically rotatably connected to said slide base. The guide mechanism is capable of guiding said link mechanism so as to vertically move the other end of said link mechanism as said slide base advances or retracts. Said seat body is capable of being lowered by said vertically moving mechanism so as to be moved from an interior position to an exterior position after the seat body is rotated from a seating position in which the seat body facing a front side of a vehicle to a laterally facing position in which the seat body facing a door opening by said rotation mechanism and is then advanced toward a vehicle exterior by said second slide mechanism. Said seat body is capable of being moved from the exterior position to the interior position by performing a reverse operation.

The vehicle seat further includes an engaged member that is integrated with said slide base in an advancing-retracting direction, an engagement member that is provided on said seat body so as to be movable between a restraint position and a restraint release position, and a guide portion that is disposed on the rotation base. When said seat body is in a retracted position with respect to said link mechanism, the engagement member is capable of moving to said restraint position, so as to be advanced to a position in which the engagement member faces said engaged member from below and from a retracting direction with respect to said link mechanism of said seat body, and is capable of moving to said restraint release position, so as to be retracted to a position in which the engagement member does not face said engaged member in the advancing-retracting direction with respect to said link mechanism of said seat body. The guide portion is capable of moving said engagement member to said restraint position when said seat body moves to the retracted position with respect to said link mechanism and said slide base is retracted to the retracted position with respect to said rotation base, and is capable of moving said engagement member to said restraint release position when said seat body is advanced from the retracted position with respect to said link mechanism or said slide base is advanced from the retracted position with respect to said rotation base.

According to the present invention, when the seat body moves to the retracted position with respect to the link mechanism and the slide base is retracted to the retracted position with respect to the rotation base, the engagement member provided on said seat body is moved to the restraint position by the guide portion disposed on the rotation base. That is, when the engagement member of the seat body is moved to the restraint position, the engagement member faces the engaged member integrated with the slide base disposed on the rotation base in the advancing-retracting direction. Thus, even when the seat body moves horizontally forwardly by a seatbelt loading, the engagement member of the seat body reliably engages the engaged member integrated with the slide base, so that the seat body can be retained on the rotation base.

Further, when the seat body is advanced from the retracted position with respect to said link mechanism or said slide base is advanced from the retracted position with respect to said rotation base, the engagement member of the seat body is moved to the restraint release position by the guide portion on the rotation base. In this way, when the engagement member of the seat body is moved to the restraint release position, the engagement member is retracted to the position in which the engagement member does not face the engaged member in the advancing-retracting direction. As a result, the engagement member of the seat body and the engaged member of the slide base do not preclude the seat body 10 from being advanced by the first slide mechanism and the second slide mechanism. That is, when the seat body is slid, sliding movement of the seat cannot be precluded even if a special operation is not performed.

In a second invention, in order to move the seat body to the exterior position, prior to advancing motion of the seat body with respect to the link mechanism, the slide base is advanced from the retracted position to a position closer to the retracted position with respect to the rotation base, thereby moving the engagement member to the restraint release position. Conversely, in order to move the seat body to the interior position, said slide base is temporarily stopped immediately before the slide base reaches the retracted position with respect to said rotation base, and said seat body is retracted to the retracted position with respect to said link mechanism, and then said slide base is retracted to the retracted position with respect to said rotation base, thereby moving said engagement member to said restraint position.

According to the present invention, in order to move the seat body to the exterior position, the slide base is advanced from the retracted position to the position closer to the retracted position with respect to the rotation base, thereby moving the engagement member to the restraint release position. That is, as the engaged member and the seat body are advanced from the retracted positions to the positions closer to the retracted positions with respect to the rotation base by the slide base, the engagement member of the seat body moves to the restraint release position.

Conversely, in order to move the seat body to the interior position, said slide base is temporarily stopped immediately before the slide base reaches the retracted position with respect to said rotation base, and said seat body is retracted to the retracted position with respect to said link mechanism, and then said slide base is retracted to the retracted position with respect to said rotation base, thereby moving said engagement member to said restraint position. That is, as the engaged member and the seat body are retracted from the positions closer to the retracted positions to the retracted positions with respect to the rotation base by the slide base, the engagement member of the seat body moves to the restraint position In this way, the engagement member of the seat body can be moved between the restraint position and the restraint release position while the engaged member of the slide base and the engagement member of the seat body are maintained in a predetermined longitudinal positional relationship. Therefore, adjustment among said engagement member, the engaged member and the guide portion is facilitated.

A third invention provides a vehicle seat which includes a seat body, a rotation mechanism having a rotation table that is capable of rotating along a vehicle floor, a vertically moving mechanism having a first slide mechanism, a link mechanism and a guide mechanism, and a second slide mechanism that supports the seat body on the other end of said link mechanism so as to be capable of being advanced and retracted. The first slide mechanism is disposed on said rotation table and having a slide base that is capable of being advanced or retracted. One end of the link mechanism is vertically rotatably connected to said slide base. The guide mechanism is capable of guiding said link mechanism so as to vertically move the other end of said link mechanism as said slide base advances or retracts. Said seat body is capable of being lowered by said vertically moving mechanism so as to be moved from an interior position to an exterior position after the seat body is rotated from a seating position in which the seat body faces a front side of a vehicle to a laterally facing position in which the seat body faces a door opening by said rotation mechanism and is then advanced toward a vehicle exterior by said second slide mechanism. Said seat body is capable of being moved from the exterior position to the interior position by performing a reverse operation.

The vehicle seat further includes an engagement member connected to said seat body, a slide engagement member connected to the vehicle floor, and an intermediate member having a first receiving portion and a second receiving portion. The intermediate member is constructed so as to be incapable of moving relative to said slide base in an advancing-retracting direction and to be capable of moving between a restraint position and a restraint release position. The intermediate member is capable of moving to the restraint position when a force directed forwardly or forwardly-upwardly is applied to said first receiving portion. Said engagement member is constructed to normally not preclude said seat body from being advanced and retracted with respect to said link mechanism. The engagement member is constructed to engage the first receiving portion of said intermediate member when said seat body moves forwardly or forwardly-upwardly with respect to said slide base upon front-end collision of the vehicle in a condition that said seat body is in the interior position, thereby transmitting a force to urge said seat body to further move to the intermediate member. Said intermediate member is constructed to normally not preclude said seat body, the second slide mechanism and the vertically moving mechanism from rotating with respect to the vehicle floor, and to normally not preclude said slide base from being advanced and retracted with respect to said rotation base. The intermediate member is also constructed such that said second receiving portion engages said slide engagement member when the intermediate member moves to said restraint position by a force transmitted from said engagement member upon the front-end collision of the vehicle in a condition that said seat body is in the interior position, thereby transmitting the force to urge the seat body to move forwardly or forwardly-upwardly to the vehicle floor.

According to the present invention, the engagement member connected to the seat body engages the first receiving portion of the intermediate member when the seat body moves forwardly or forwardly-upwardly with respect to the slide base upon front-end collision of the vehicle in a condition that the seat body is in the interior position, thereby transmitting a force to urge the seat body to further move to the intermediate member.

Further, the intermediate member moves to the restraint position by a force transmitted from the engagement member of the seat body, so that the second receiving portion of the intermediate member engages the slide engagement member, thereby transmitting the force to urge the seat body to move forwardly or forwardly-upwardly to the vehicle floor.

That is, even when the seat body moves horizontally forwardly, the engagement member of the seat body engages the first receiving portion of the intermediate member. As a result, the intermediate member moves to the restraint position, so that the second receiving portion of the intermediate member engages the slide engagement member of the vehicle floor. Thus, even when the seat body moves horizontally forwardly with respect to the vehicle floor by the seatbelt loading, a lock mechanism reliably functions.

Further, the engagement member of the seat body does not normally preclude the seat body from being advanced and retracted with respect to the link mechanism. Further, the intermediate member does not normally preclude the seat body, the second slide mechanism and the vertically moving mechanism from rotating with respect to the vehicle floor. Also, the intermediate member does not normally preclude the slide base from being advanced and retracted with respect to the rotation base. That is, when the seat body is rotated and slid, rotational movement and sliding movement of the seat body cannot be precluded even if a special operation is not performed.

EFFECT OF THE INVENTION

According to the present invention, even when the seat body moves horizontally forwardly with respect to the vehicle floor by the seatbelt loading, a lock mechanism can reliably function. Further, when the seat body is slid, sliding movement of the seat body cannot be precluded even if a special operation is not performed.

DETAILED DESCRIPTION OF THE INVENTION

Figure 1:
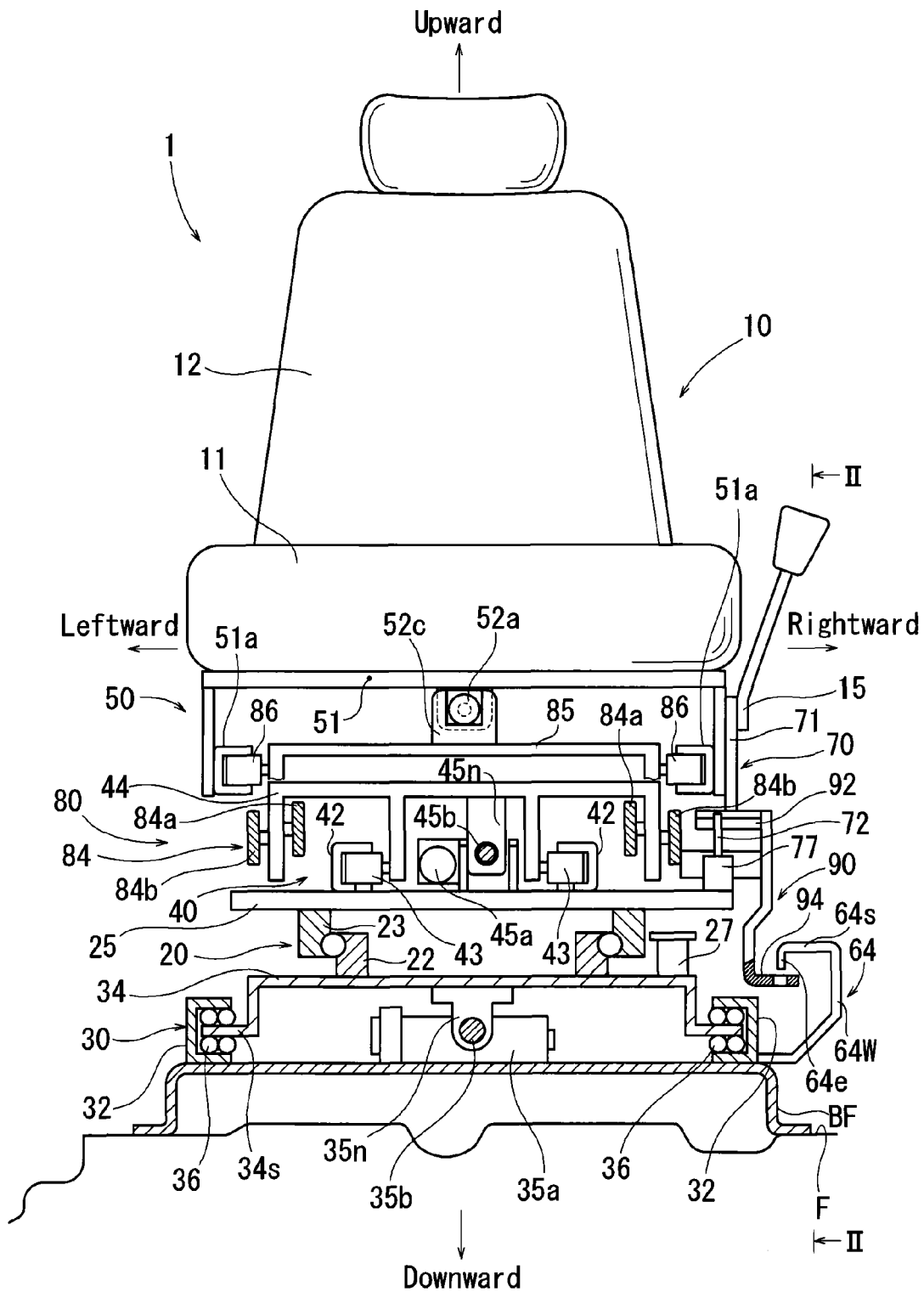
FIG. 1 is a schematic rear view of a vehicle seat according to Embodiment 1 of the present invention.

F . . . vehicle floor
10 . . . seat body
20 . . . rotation mechanism
25 . . . rotation base
40 . . . first slide mechanism
44 . . . first slide base
50 . . . second slide mechanism
64 . . . slide engagement member
70 . . . engagement member
72 . . . hook
77 . . . guide portion
80 . . . vertically moving mechanism
84 . . . four-joints link mechanism
85 . . . vertically moving base
88 . . . guide mechanism
90 . . . intermediate member
92 . . . first receiving portion (engaged member)
94 . . . second receiving portion

BEST MODE FOR CARRYING OUT THE INVENTION

In the following, vehicle seats according to Embodiment 1 and Embodiment 2 of the present invention will be described with reference to the drawings.

Embodiment 1

In the following, the vehicle seat according to Embodiment 1 of the present invention will be described with reference to FIGS. 1 to 12(B). The vehicle seat of this embodiment is a seat that is used as a passenger seat of a vehicle.

Further, forward and rearward, rightward and leftward, and upward and downward in the drawings respectively correspond to forward and rearward, rightward and leftward, and upward and downward of the vehicle.

<Regarding Outline of Vehicle Seat 1>

A vehicle seat 1 of this embodiment is a device that is capable of horizontally advancing a seat body 10 to vehicle exterior via a door opening, and further advancing and lowering the seat body 10 to a getting-in/out position after the seat body 10 is rotated from a seating position in which the seat body 10 faces a front side of the vehicle to a laterally facing position in which the seat body 10 faces the door opening. The vehicle seat 1 is constructed such that the seat body 10 can be returned to the seating position by a reverse operation.

As illustrated in FIG. 1, the vehicle seat 1 includes a longitudinal slide mechanism 30 that is disposed on a vehicle floor F, a rotation mechanism 20 that is disposed on a longitudinal slide base 34 of the longitudinal slide mechanism 30, a vertically moving mechanism 80 that is disposed on a rotation base 25 of the rotation mechanism 20, a second slide mechanism 50, and the seat body 10 that is disposed on the second slide mechanism 50.

<Regarding Longitudinal Slide Mechanism 30>

The longitudinal slide mechanism 30 is a mechanism that is capable of moving the seat body 10 in a longitudinal direction of the vehicle. As illustrated in FIG. 1, etc., the longitudinal slide mechanism 30 has a pair of right and left stationary rails 32 that are disposed on a stationary base BF of the vehicle floor F so as to extend in the longitudinal direction of the vehicle, and the longitudinal slide base 34 that is slidably supported on the stationary rails 32 so as to slide longitudinally.

As illustrated in FIG. 1, etc., each of the stationary rails 32 is formed to a substantially U-shape in cross section. Movable rail portions 34s formed in right and left end edges of the longitudinal slide base 34 are inserted into U-shaped recesses of the stationary rails 32. Further, a large number of balls 36 are rotatably fitted into upper and lower clearances that are formed between the movable rail portions 34s and the stationary rails 32. As a result, the longitudinal slide base 34 can move smoothly along the stationary rails 32.

A screw shaft 35b is supported on the stationary base BF in parallel to the stationary rails 32 so as to rotate about an axis thereof. One end of the screw shaft 35b is coaxially connected to a rotation shaft (not shown) of a drive motor 35a. Further, fixed to a lower surface of the longitudinal slide base 34 is a nut 35n that threadably engages said screw shaft 35b. As a result, when the screw shaft 35b is rotated in normal or reverse directions by the drive motor 35a, the longitudinal slide base 34 slides longitudinally due to threadable engagement of the screw shaft 35b and the nut 35n.

<Regarding Rotation Mechanism 20>

The rotation mechanism 20 is disposed on the longitudinal slide base 34. The rotation mechanism 20 is a mechanism that is capable of rotating the seat body 10 between the seating position in which the seat body 10 faces the front side of the vehicle and the laterally facing position in which the seat body 10 faces a door opening for an angular range of approximately 90 degrees.

The rotation mechanism 20 has an inner ring 22 and an outer ring 23 that are capable of rotating relative to each other. A large number of balls (not shown) are fitted between a V-shaped groove circumferentially formed in an outer side of the inner ring 22 and a V-shaped groove circumferentially formed in an inner side of the outer ring 23. As a result, it is possible to smoothly rotate the outer ring 23 with respect to the inner ring 22 without rattling. In the rotation mechanism 20, the inner ring 22 is fixed to the longitudinal slide base 34 and the rotation base 25 is disposed on the outer ring 23.

A rotation motor 27 is fixed to an upper surface of the longitudinal slide base 34. A rotation output of the rotation motor 27 is transmitted to the outer ring 23 via a gear transmission mechanism (not shown), so that the rotation base 25 rotates with respect to the longitudinal slide base 34.

<Regarding Vertically Moving Mechanism 80>

A first slide mechanism 40 of the vertically moving mechanism 80 is disposed on the rotation base 25. The first slide mechanism 40 is a mechanism that functions as an operation source of the vertically moving mechanism 80. The first slide mechanism 40 advances or retracts the seat body 10 that is in the laterally facing position in which the seat body 10 faces the door opening.

As illustrated in FIG. 1, the first slide mechanism 40 includes a pair of guide rails 42 that are disposed on the rotation base 25 in parallel with each other so as to extend along right and left end edges thereof. The guide rails 42 are formed to a U-shape in cross section and are positioned on the rotation base 25 such that respective recesses thereof are opposed to each other. Further, guide rollers 43 of a first slide base 44 are respectively fitted into the recesses of the guide rails 42. The first slide base 44 includes a plurality of guide rollers 43 that are disposed on a right side thereof and a plurality of guide rollers 43 that are disposed on a left side thereof. The guide rollers 43 disposed on the right and left sides of the first slide base 44 are respectively fitted into the recesses of the guide rails 42, so as to be capable of rotationally moving along the guide rails 42.

As illustrated in FIG. 1, a screw shaft 45b is supported on the rotation base 25 in parallel with the guide rails 42 so as to rotate about an axis thereof. One end of the screw shaft 45b is coaxially connected to a rotation shaft (not shown) of a drive motor 45a. Further, fixed to a lower surface of the first slide base 44 is a nut 45n that threadably engages said screw shaft 45b. As a result, when the screw shaft 45b is rotated in normal or reverse directions by the drive motor 45a, the first slide base 44 is advanced or retracted along the guide rails 42 due to threadable engagement of the screw shaft 45b and the nut 45n.

As illustrated in FIGS. 1 and 9 to 11, a pair of right and left four-joints link mechanisms 84 constituting the vertically moving mechanism 80 are vertically tiltably connected to the first slide base 44. Each of a pair of right and left four-joints link mechanisms 84 includes an inner link arm 84a and an outer link arm 84b. Further, proximal end portions of the link arms 84a and 84b are respectively vertically rotatably supported on a side portion of the first slide base 44 via support shafts (not shown). As illustrated in FIG. 12(A), distal ends of the link arms 84a and 84b are respectively vertically rotatably connected to a side wall portion of a vertically moving base 85 via support shafts. The support shafts of the link arms 84a and 84b are displaced from each other in a longitudinal direction of the seat body 10.

Figure 11:
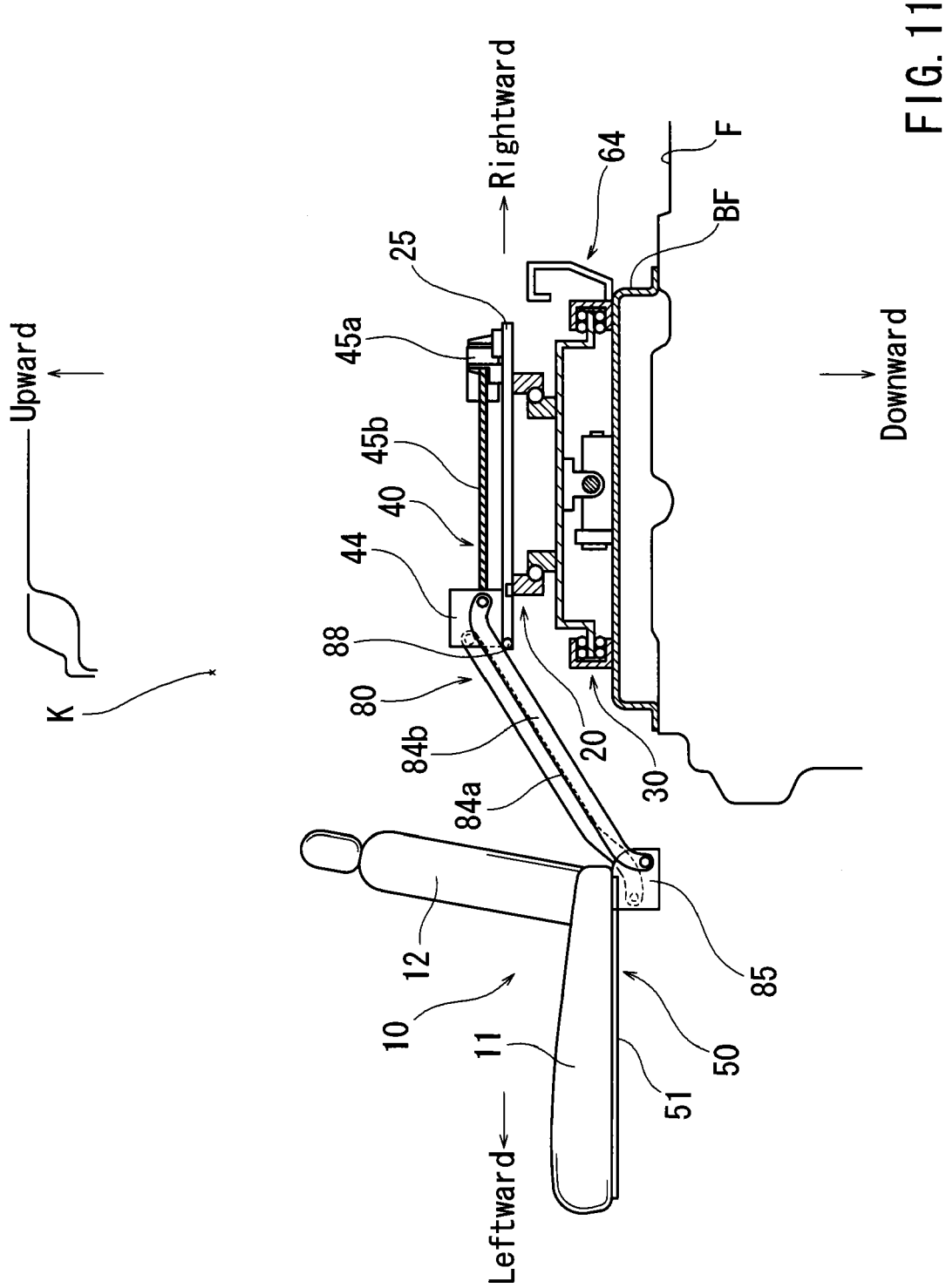
FIG. 11 is a side view which illustrates the motion of the vehicle seat.
Figure 12:
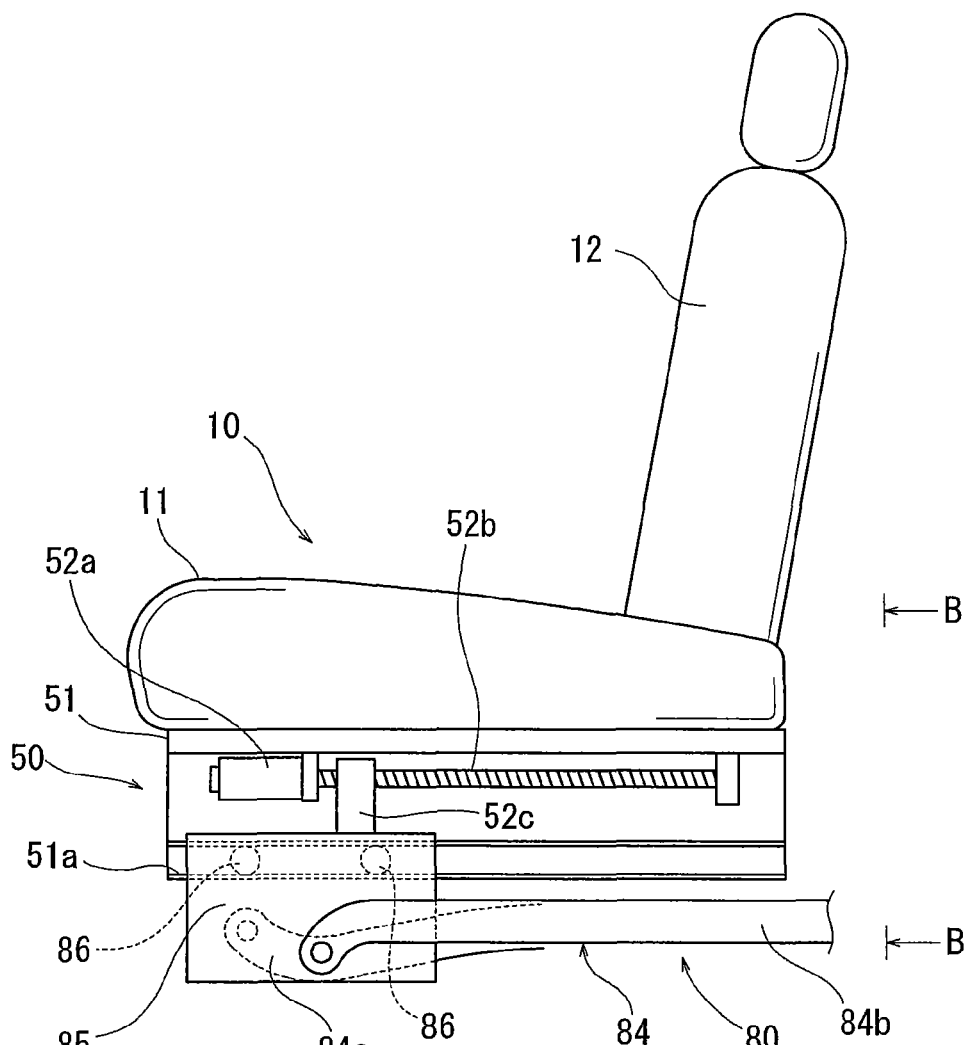
FIG. 12(A) is a side view of the vehicle seat, which illustrate a second slide mechanism.
FIG. 12(B) is an enlarged vie viewed from a direction shown by B-B of FIG. 12(A).
Figure 12:
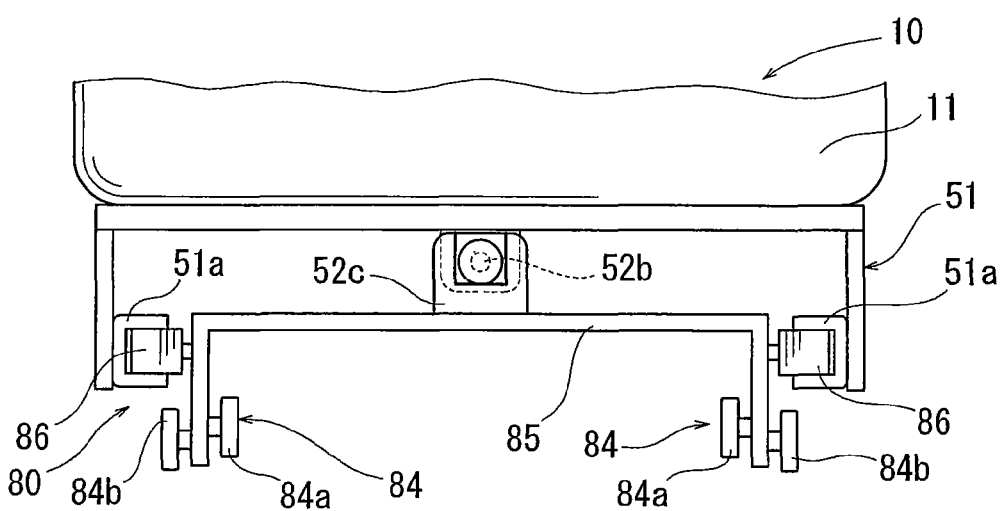
Figure 13:
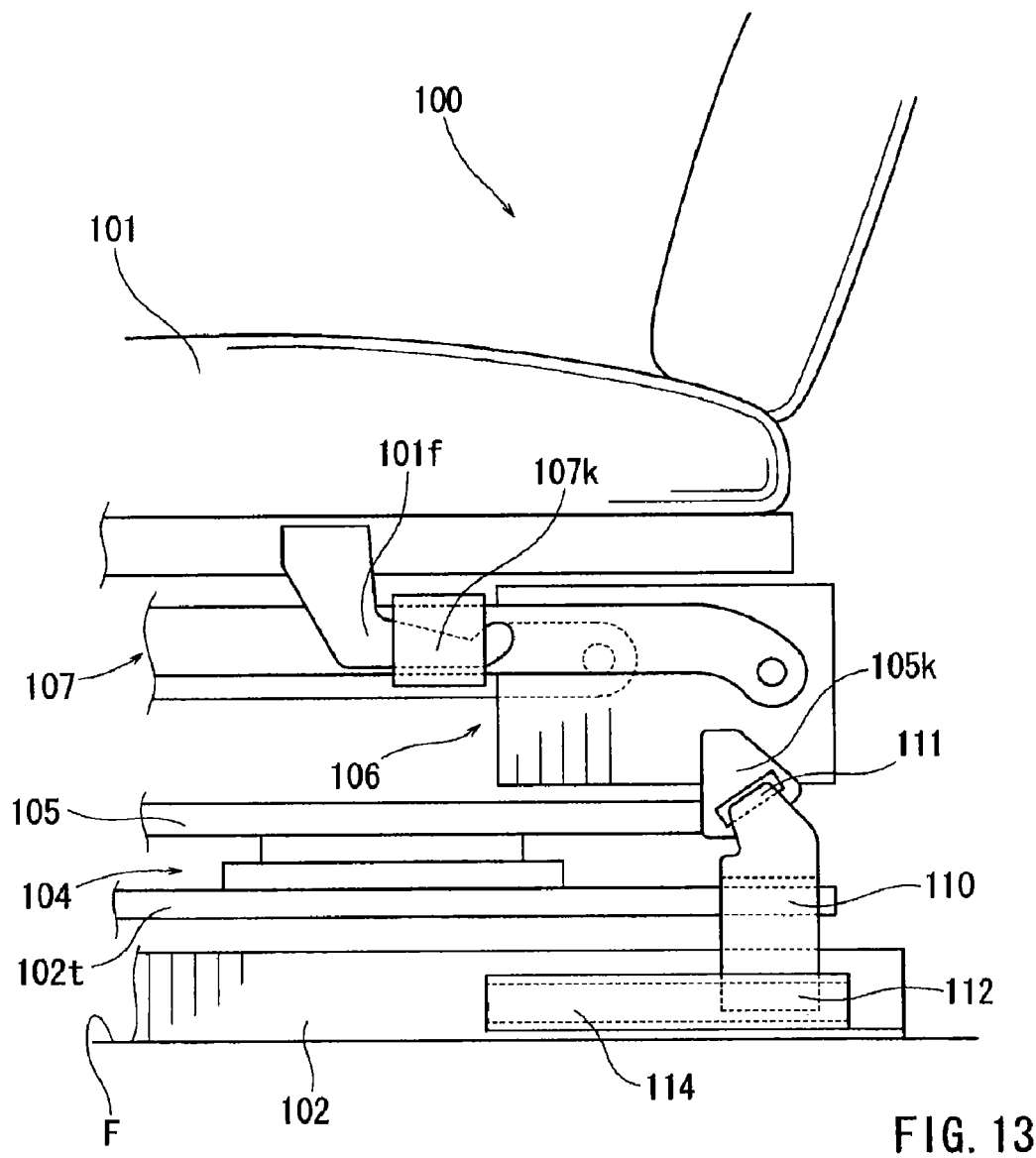
FIG. 13 is a schematic side view of a conventional vehicle seat.

As illustrated in FIG. 11, provided at a forward end of the rotation base 25 is a guide mechanism 88 that is capable of supporting the right and left outer link arms 84b from below and is capable of converting advancing or retracting movement of the four-joints link mechanisms 84 into descending or ascending movement of the vertically moving base 85. That is, when the link arms 84a and 84b of the four-joints link mechanisms 84 are advanced as the first slide base 44 is advanced, a distance between the guide mechanism 88 and the first slide base 44 is decreased, so that the four-joints link mechanisms 84 rotates downwardly about the support shafts of the first slide base 44. As a result, the vertically moving base 85 connected to forward ends of the four-joints link mechanisms 84 descends horizontally. Further, when the link arms 84a and 84b of the four-joints link mechanisms 84 are retracted as the first slide base 44 is retracted, the distance between the guide mechanism 88 and the first slide base 44 is increased, so that the four-joints link mechanisms 84 rotate upwardly about the support shafts of the first slide base 44. As a result, the vertically moving base 85 connected to the forward ends of the four-joints link mechanisms 84 ascends.

<Regarding Second Slide Mechanism 50>

Figure 10:
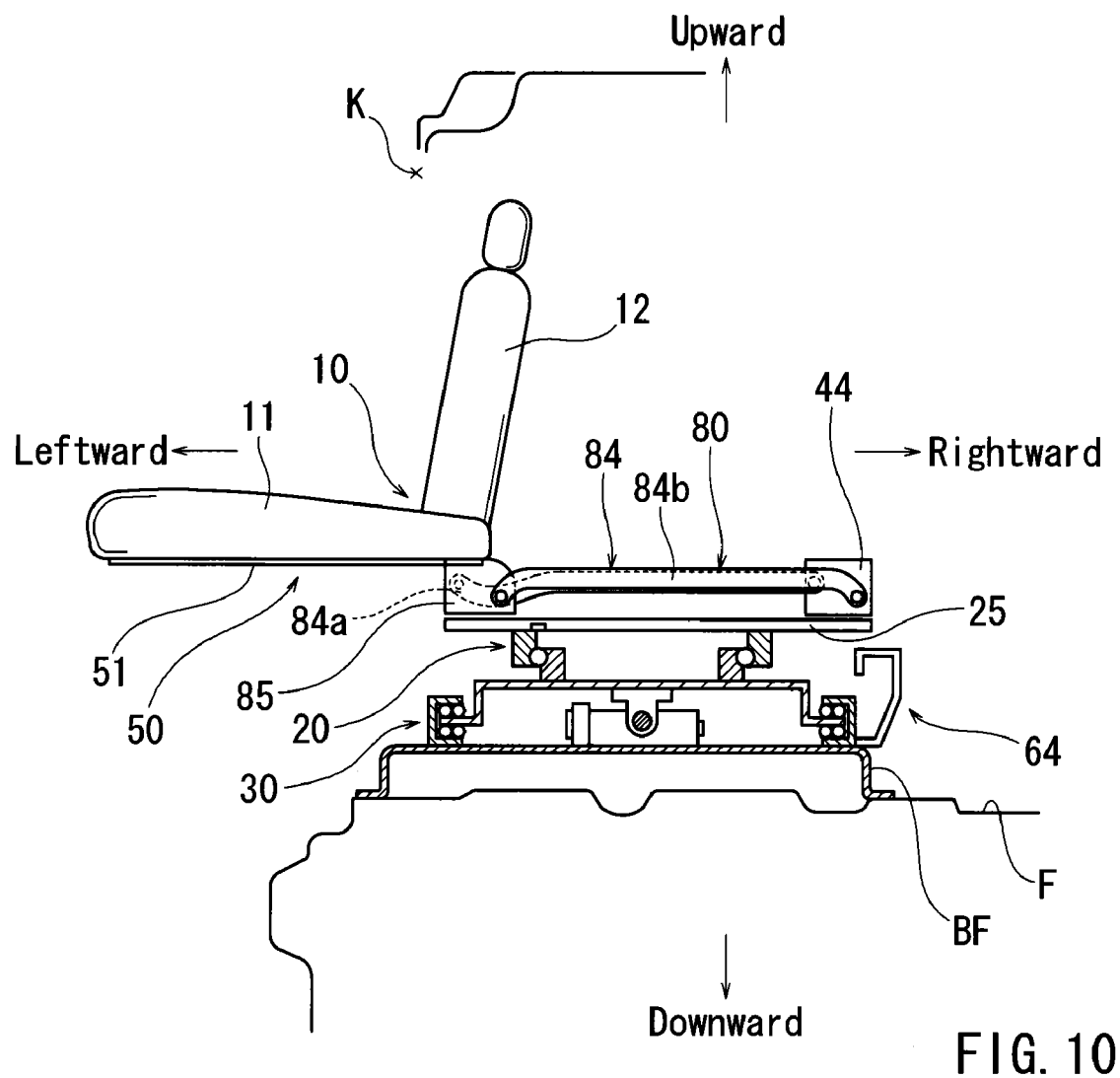
FIG. 10 is a side view which illustrates the motion of the vehicle seat.

As illustrated in, for example, FIGS. 1, 10, 11, the second slide mechanism 50 is installed on the vertically moving base 85. The second slide mechanism 50 is a mechanism that is capable of advancing or retracting the seat body 10 on the vertically moving base 85.

As illustrated in FIGS. 1, 12(A) and (B), the second slide mechanism 50 has a seat base 51 supporting the seat body 10. The seat base 51 is constructed to be slidable in a longitudinal direction of the seat with respect to the vertically moving base 85. Fixed to right and left wall portions protruding from a lower surface of the seat base 51 are guide rails 51a that respectively extend in the longitudinal direction of the seat. The guide rails 51a are formed to a U-shape in cross section and are positioned on the right and left wall portions such that respective recesses thereof are opposed to each other. Further, fitted into the recesses of the guide rails 51a are guide rollers 86 that are rotatably attached to side surfaces of the vertically moving base 85. The vertically moving base 85 includes a plurality of guide rollers 86 that are disposed on a right side thereof and a plurality of guide rollers 86 that are disposed on a left side thereof. The guide rollers 86 disposed on the right and left sides of the vertically moving base 85 are respectively fitted into the recesses of the guide rails 51a, so as to be capable of rolling along the guide rails 51a.

A screw shaft 52b is supported on a lower surface of the seat base 51 in parallel to the guide rails 51a so as to rotate about an axis thereof. One end of the screw shaft 52b is coaxially connected to a rotation shaft (not shown) of a drive motor 52a. Further, fixed to an upper surface of the vertically moving base 85 is a nut 52c that threadably engages said screw shaft 52b. As a result, when the screw shaft 52b is rotated in normal or reverse directions by the drive motor 52a, the seat body 10 and the seat base 51 slide with respect to the vertically moving base 85 due to the threadable engagement of the screw shaft 52b and the nut 52c.

<Regarding Seat Body 10>

Figure 2:
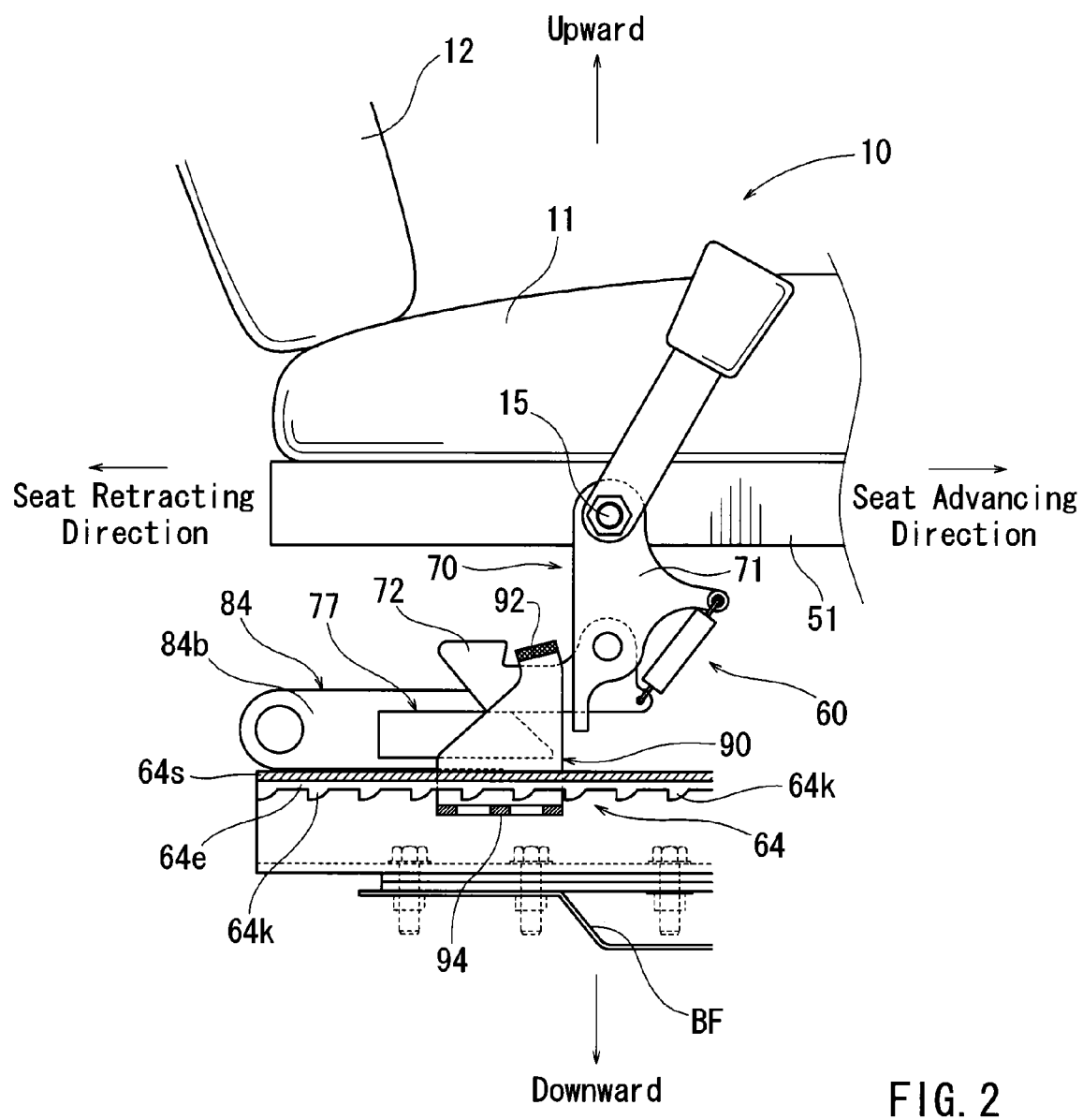
FIG. 2 is a side view, which illustrates a slide lock mechanism of the vehicle seat.

As illustrated in, for example, FIG. 12(A), the seat body 10 has a seat cushion 11 and a seat back 12. The seat cushion 11 is integrated with the seat base 51. Further, as illustrated in FIGS. 1 and 2, a seatbelt anchor 15 is attached to a right rear portion of the seat base 51 of the seat body 10. A seatbelt loading is applied to the anchor 15.

An engagement member 70 of a slide lock mechanism 60 is connected to the seatbelt anchor 15 of the seat body 10.

<Regarding Slide Lock Mechanism 60>

The slide lock mechanism 60 is a mechanism that is capable of restraining the seat body 10 from moving forwardly with respect to the vehicle floor F due to an inertial force (the seatbelt loading) of an occupant applied to the seat body 10 via the seatbelt or an own inertial force of the seat body 10 when front-end collision of the vehicle happens in a condition that the seat body 10 is in the seating position in which the seat body 10 faces the front side of the vehicle.

As illustrated in, for example, FIG. 2, the slide lock mechanism 60 includes the engagement member 70 provided to the seat body 10, a guide portion 77 disposed on the rotation base 25, an intermediate member 90 provided to a base end portion of the four-joints link mechanism 84 that is capable of moving together with the first slide base 44, and a slide engagement member 64 disposed on the vehicle floor F <Regarding Engagement Member 70 of Slide Lock Mechanism 60>

Figure 3:
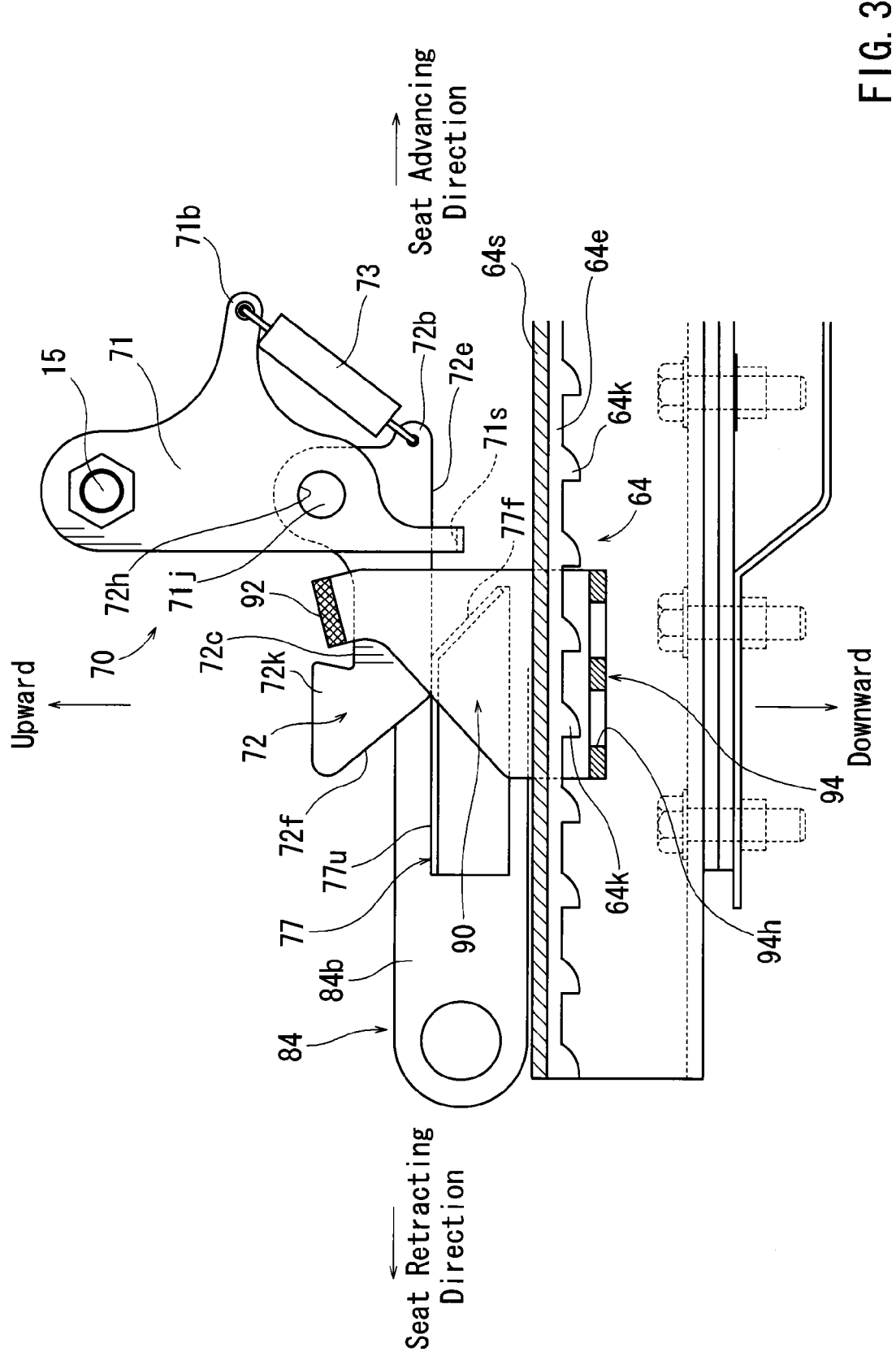
FIG. 3 is an enlarged side view which illustrates an operation of the slide lock mechanism.

The engagement member 70 of the slide lock mechanism 60 includes a stationary bracket 71 that is connected to the seatbelt anchor 15 of the seat body 10, and a hook 72 that is vertically rotatably connected to the stationary bracket 71. As illustrated in FIG. 3, the stationary bracket 71 is a rotated T-shaped plate member. The stationary bracket 71 is vertically positioned and an upper end portion thereof is connected to the seatbelt anchor 15. Further, the hook 72 is connected to a lower portion of the stationary bracket 71 via a support shaft 71j. Further, a lower projected end portion of the stationary bracket 71 is bent to form a lower limit stopper 71s that can prevent the hook 72 from rotating. Further, formed in a forward end (a right end in FIG. 3) of the stationary bracket 71 is a spring engagement portion 71b that is engageable with one end of a coil spring 73.

The hook 72 is a plate member having a cutout 72c. The cutout 72c forms a hook portion 72k in an upper side of a forward end portion of the hook 72. Formed in an upper side of a base end portion of the hook 72 is an opening 72h through which a support shaft 71j of the stationary bracket 71 is passed. Further, when the hook 72 is connected to the stationary bracket 71, the forward end portion of the hook 72 is projected rearwardly from the stationary bracket 71. The forward end portion of the hook 72 is formed to a parallelogram-shape such that an upper corner portion may have an acute angle and as a result, a forward end surface 72f is formed as a downwardly directed inclined surface. Further, formed in a lower side of the base end portion of the hook 72 is a spring engagement portion 72b that is engageable with the other end of the coil spring 73.

Figure 5:
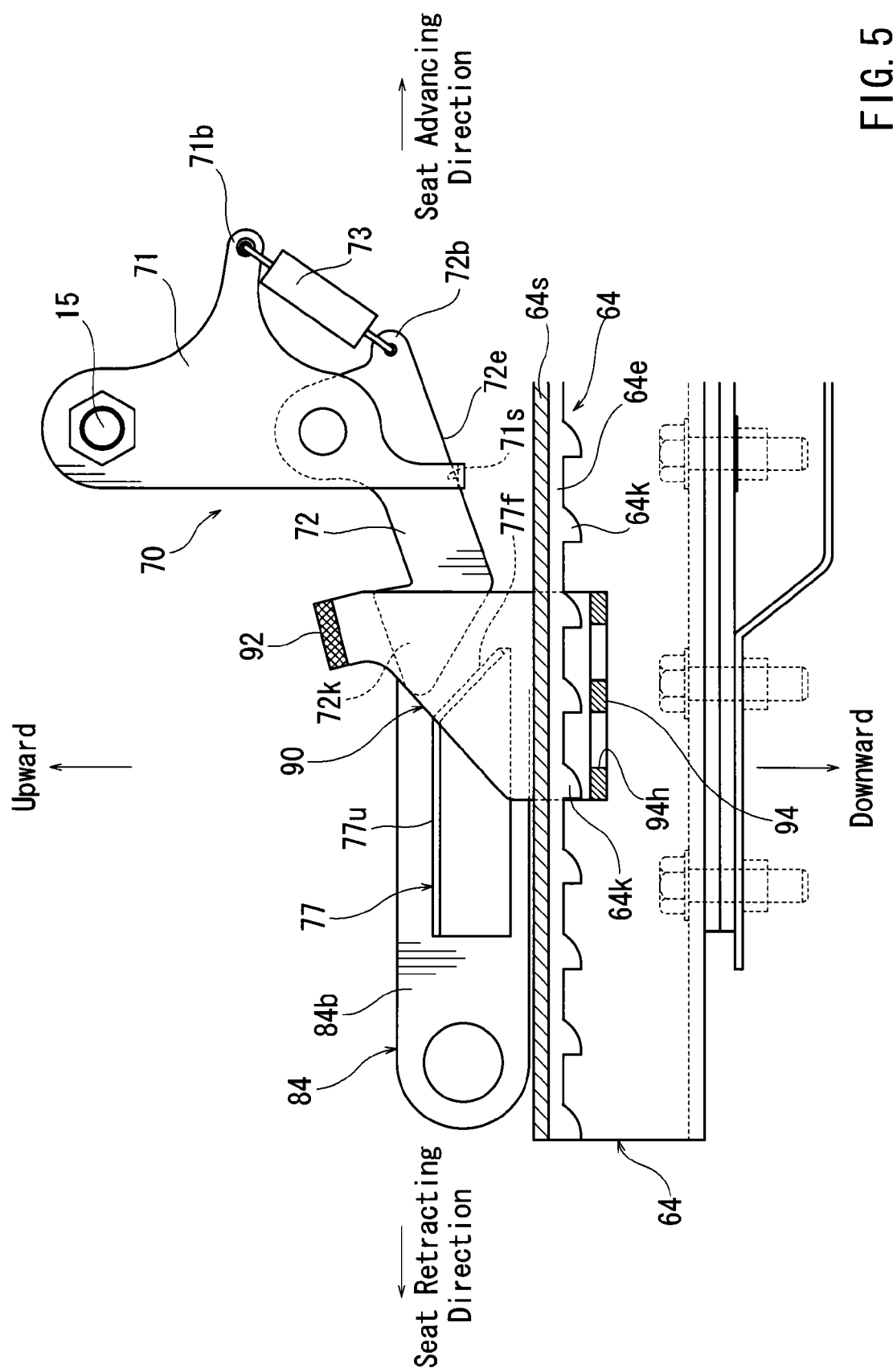
FIG. 5 is an enlarged side view which illustrates the operation of the slide lock mechanism.

The coil spring 73 is biased so as to rotate the hook 72 counterclockwise (downwardly) in FIG. 3. Thus, when no external force is applied to the hook 72, a lower side 72e of the hook 72 contacts the lower limit stopper 71s by a spring force of the coil spring 73, so that as illustrated in FIG. 5, the hook 72 is maintained at a lower limit position thereof while it is inclined downwardly.

<Regarding Guide Portion 77 of Slide Lock Mechanism 60>

A guide portion 77 of the slide lock mechanism 60 may function to rotate the hook 72 of the engagement member 70 upwardly by approximately 10 degrees from the lower limit position (FIG. 5) to a horizontal position (an upper limit position) when the seat body 10 retracts to a retracted position (an original position) on the rotation base 25 due to the operation of the first slide mechanism 40 and the second slide mechanism 50.

The guide portion 77 is disposed on an upper surface of the rotation base 25 so as to be positioned at a predetermined position of a right rear end portion thereof. The guide portion 77 is formed to a short rail-shape that extends in a sliding direction of the seat body 10. As illustrated in, for example, FIGS. 3 and 4, the guide portion 77 has an inclined guide surface 77f that is formed in a front side (a left side in FIG. 4) thereof and a horizontal guide surface 77u that is formed in an upper side thereof. The inclined guide surface 77f is inclined so as to be increased in height in a rear side of the guide portion 77 and to reach the horizontal guide surface 77u. Further, the guide portion 77 is constructed such that a height of the horizontal guide surface 77u is equal to a height of the lower side 72e of the hook 72 that is positioned in the horizontal position (the upper limit position).

Thus, as described hereinafter, when the seat body 10 is retracted by the operation of the first slide mechanism 40 and the second slide mechanism 50 and comes closer to the retracted position (the original position) on the rotation base 25, the forward end of the hook 72 contacts the inclined guide surface 77f of the guide portion 77. In this condition, when the seat body 10 is further retracted, the hook 72 is pushed onto the inclined guide surface 77f against the spring force of the coil spring 73, so as to be rotated upwardly (clockwise). Further, when the hook 72 is rotated to the horizontal position (the upper limit position), the lower side 72e of the hook 72 is supported by the horizontal guide surface 77u of the guide portion 77. In this condition, when the seat body 10 is further retracted, the lower side 72e of the hook 72 slides on the horizontal guide surface 77u of the guide portion 77. Thus, the hook 72 is maintained in the horizontal position (the upper limit position).

<Regarding Intermediate Member 90 of Slide Lock Mechanism 60>

The intermediate member 90 of the slide lock mechanism 60 is a member that connects the engagement member 70 of the seat body 10 and a slide engagement member 64 (which will be described hereinafter) of the vehicle floor F when the front-end collision of the vehicle happens. The intermediate member 90 is secured to the outer link arm 84b of the right four-joints link mechanism that is connected to the first slide base 44. That is, the intermediate member 90 is capable of sliding together with the first slide base 44 of the first slide mechanism 40 in the longitudinal direction of the seat.

As illustrated in, for example, FIG. 3, the intermediate member 90 is a plate member that is shaped to have a wide lower portion and to be narrowed toward an upper end. A most narrowed portion adjacent to the upper end is bent in a direction perpendicular to a plane of FIG. 3, so as to form a hook-like first receiving portion 92 therein. Further, a lower end of the intermediate member 90 is bent in a direction opposite to the first receiving portion 92, so as to form a second receiving portion 94 therein. The second receiving portion 94 of the intermediate member 90 is formed so as to be substantially horizontal. Conversely, the first receiving portion 92 is slightly inclined so as to be raised forwardly.

As illustrated in FIGS. 2 and 3, in a condition that the intermediate member 90 is retained at a retracted position of the rotation base 25 by the first slide base 44, the first receiving portion 92 of the intermediate member 90 is positioned in front of the hook portion 72k of the hook 72 of the engagement member 70 of the seat body 10 that is positioned at the retracted position of the rotation base 25. As illustrated in FIG. 5, the height of the first receiving portion 92 of the intermediate member 90 is set such that the hook 72 retained at the lower limit position can pass below the first receiving portion 92. Further, as illustrated in, for example, FIGS. 3 and 4, the height of the first receiving portion 92 is set such that the hook 72 retained at the upper limit position can engage the first receiving portion 92.

Figure 4:
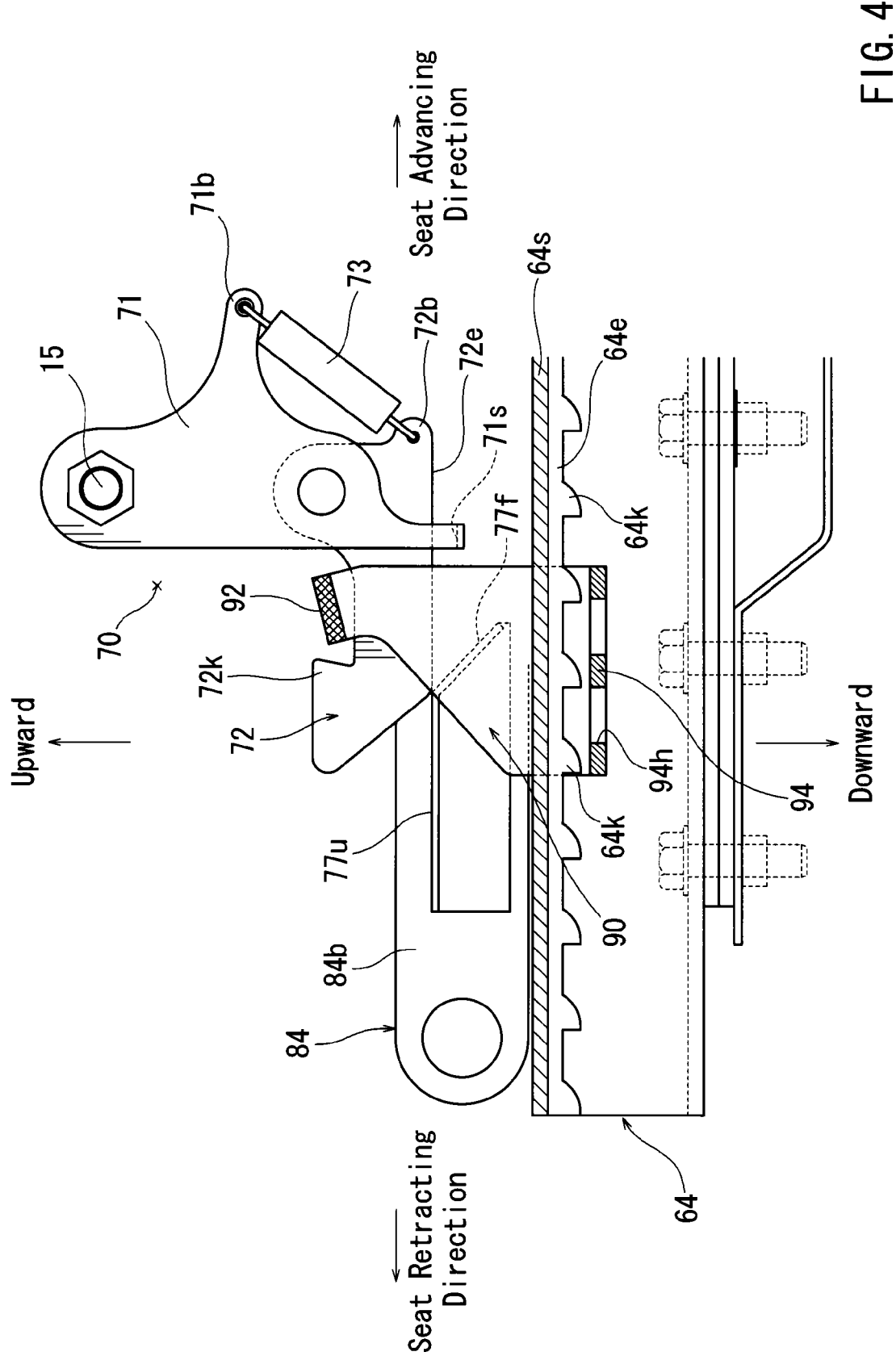
FIG. 4 is an enlarged side view which illustrates the operation of the slide lock mechanism.

Thus, as described hereinafter, when the seat body 10 is retracted with respect to the vertically moving base 85 of the four-joints link mechanisms 84 by the second slide mechanism 50 while the intermediate member 90 is in a position closer to the retracted position of the rotation base 25, as illustrated in FIG. 5, the hook 72 of the engagement member 70 of the seat body 10 passes below the first receiving portion 92 of the intermediate member 90 in the position closer to the retracted position with respect to the four-joints link mechanism 84. Further, the first slide base 44 is retracted from the position closer to a retracted position of the rotation base 25 to the retracted position after the seat body 10 is retracted to the retracted position with respect to the four-joints link mechanisms 84 by the second slide mechanism 50, the intermediate member 90 and the seat body 10 are retracted to the retracted positions of the rotation base 25. Further, as illustrated in FIGS. 3 and 4, when the seat body 10 is retracted from the position closer to the retracted position of the rotation base 25 to the retracted position, the hook 72 is pushed onto the inclined guide surface 77f of the guide portion 77 against the spring force of the coil spring 73, so as to be rotated to the horizontal position (the upper limit position). As a result, the hook portion 72k of the hook 72 of the engagement member 70 faces the first receiving portion 92 of the intermediate member 90 in an advancing-retracting direction. That is, the hook 72 of the engagement member 70 and the first receiving portion 92 of the intermediate member 90 are positioned to be capable of engaging each other in the advancing-retracting direction.

Further, in this condition, when the first slide base 44 is advanced with respect to the rotation base 25, the intermediate member 90 and the seat body 10 are advanced with respect to the guide portion 77 on the rotation base 25. As a result, the hook 72 of the engagement member 70 moves downwardly along the inclined guide surface 77f of the guide portion 77 by the spring force of the coil spring 73, so as to be rotated downwardly to the lower limit position. As a result, the hook portion 72k of the hook 72 of the engagement member 70 is displaced so as to not face the first receiving portion 92 of the intermediate member 90 in the advancing-retracting direction (FIG. 5). Thus, the two components 72 and 92 are positioned to be incapable of engaging each other in the advancing-retracting direction.

That is, the upper limit position of the hook 72 of the engagement member 70 corresponds to a restraint position of the present invention, and the lower limit position of said hook 72 corresponds to a restraint release position of the present invention. Further, the first receiving portion 92 of the intermediate member 90 corresponds to an engaged member of the present invention.

<Regarding Slide Engagement Member 64 of Slide Lock Mechanism 60>

As illustrated in, for example, FIG. 1, the slide engagement member 64 is attached to the stationary base BF of the vehicle floor F along the right stationary rail 32 of the longitudinal slide mechanism 30. As illustrated in FIG. 1, the slide engagement member 64 is a short rail-shape member that is formed to have a substantially C-shaped cross-sectional configuration. The slide engagement member 64 has a longitudinal plate portion 64w and a lateral plate portion 64s that is projected laterally (inwardly in a vehicle width direction) from an upper end of the longitudinal plate portion 64w. Further, as illustrated in, for example, FIG. 3, formed in a projected periphery of said lateral plate portion 64s is an engagement portion 64e that is downwardly protruded. The engagement portion 64e has a plurality of engagement teeth 64k.

The engagement portion 64e of the slide engagement member 64 is positioned so as to be located directly above the second receiving portion 94 of the intermediate member 90 with intervening a clearance therebetween when the seat body 10 is in the seating position in which the seat body 10 faces the front side of the vehicle. That is, the second receiving portion 94 of the intermediate member 90 is formed so as to be positioned under the lateral plate portion 64s of the slide engagement member 64 when the seat body 10 is in the seating position in which the seat body 10 faces the front side of the vehicle. Further, slot-shaped openings 94h are formed in the second receiving portion 94 of the intermediate member 90. The openings 94h are positioned so as to correspond to the engagement teeth 64k of the engagement portion 64e of the slide engagement member 64. The openings 94h are shaped such that the engagement teeth 64k are capable of passing therethrough.

<Regarding Outline of Operation of Vehicle Seat 1>

Figure 8:
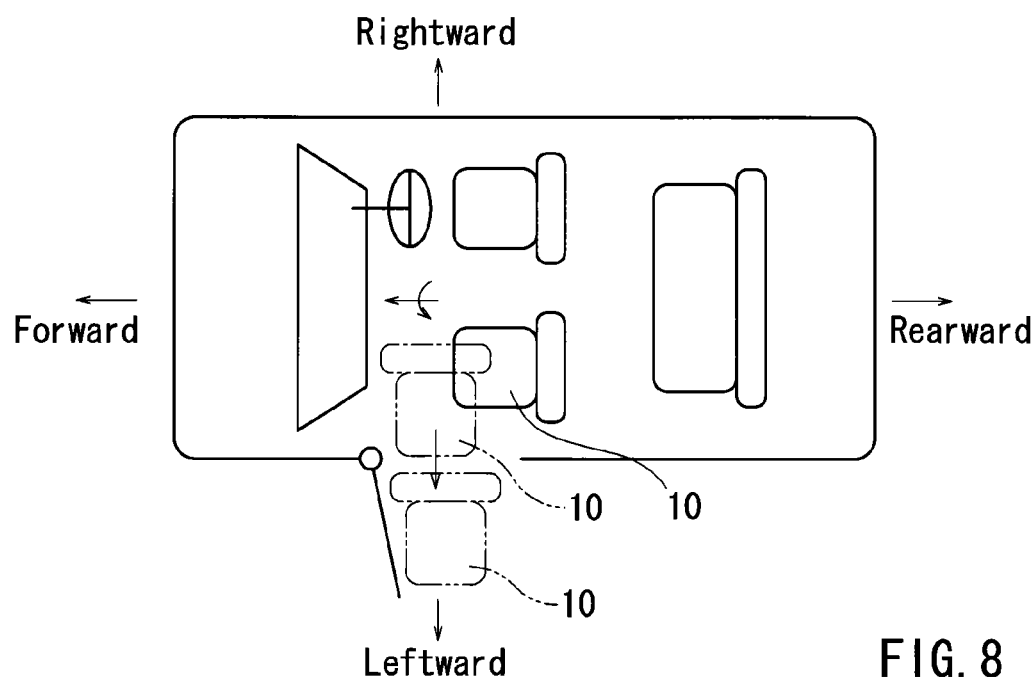
FIG. 8 is a plan view which illustrates motion of the vehicle seat.
Figure 9:
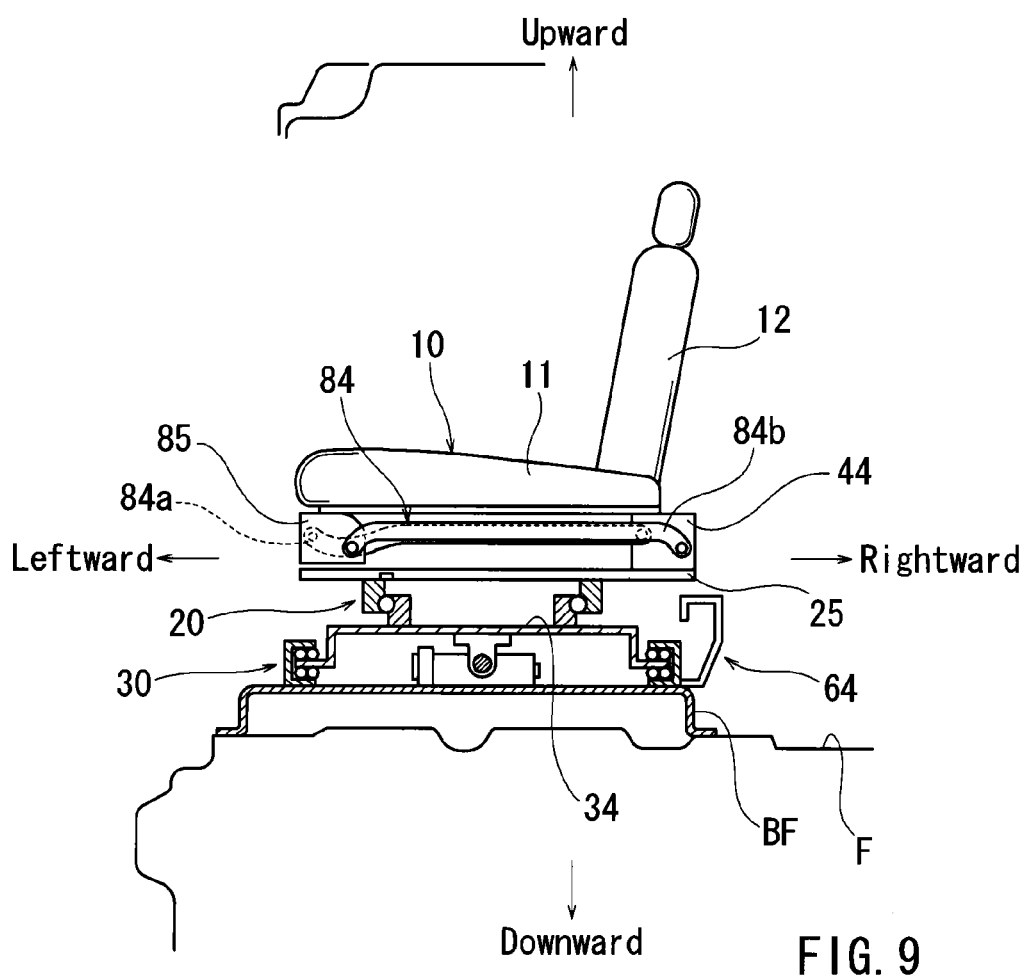
FIG. 9 is a side view which illustrates the motion of the vehicle seat.

In order to move the seat body 10 to the getting-in/out position in the vehicle exterior, the seat body 10 is first moved to the rotation position in a vehicle interior by the longitudinal slide mechanism 30. Thereafter, the seat body 10 is horizontally rotated by approximately 90 degrees to the laterally facing position in which the seat body 10 faces the door opening by the rotation mechanism 20 (FIGS. 8 and 9). At this time, the second receiving portion 94 of the intermediate member 90 connected to the rotation base 25 is vertically positioned relative to the engagement portion 64e of the slide engagement member 64 with intervening the clearance therebetween. Therefore, the intermediate member 90 and the engagement portion 64e of the slide engagement member 64 do not preclude the seat body 10 from being advanced and rotated.

Next, the first slide mechanism 40 on the rotation base 25 is operated, so that the first slide base 44 is slightly advanced with respect to the rotation base 25 from the retracted position to the position closer to the retracted position. Thus, the intermediate member 90 and the seat body 10 are advanced with respect to the guide portion 77 disposed on the rotation base 25. As a result, the hook 72 of the engagement member 70 moves downwardly along the inclined guide surface 77f of the guide portion 77 by the spring force of the coil spring 73, so as to be rotated downwardly to the lower limit position. As a result, the hook portion 72k of the hook 72 of the engagement member 70 is displaced so as to not face the first receiving portion 92 of the intermediate member 90 in the advancing-retracting direction (FIG. 5). That is, the hook 72 of the engagement member 70 is retained at the restraint release position.

In this state, the second slide mechanism 50 disposed on the vertically moving base 85 of the four-joints link mechanisms 84 is operated, so that the seat body 10 is advanced toward the vehicle exterior (FIG. 10). As described above, because the hook 72 of the engagement member 70 is retained at the restraint release position by means of the guide portion 77, the hook 72 of the engagement member 70 and the first receiving portion 92 of the intermediate member 90 do not preclude the seat body 10 from being advanced. Thus, when the seat body 10 moves to the advanced position with respect to the vertically moving base 85 of the four-joints link mechanisms 84, the first slide mechanism 40 disposed on the rotation base 25 is operated again, so that the first slide base 44 is advanced with respect to the rotation base 25. As a result, the distance between the guide mechanism 88 disposed on the forward end of the rotation base 25 and the first slide base 44 is decreased, so that the four-joints link mechanisms 84 rotates downwardly about the support shafts of the first slide base 44 (FIG. 11). As a result, the seat body 10 disposed on the vertically moving base 85 of the four-joints link mechanisms 84 descends horizontally to the getting-in/out position.

Further, in order to move the seat body 10 from the getting-in/out position in the vehicle exterior to the seating position in the vehicle interior, a reverse operation from the operation described above is performed.

When the seat body 10 is returned to an interior position, the second slide mechanism 50 is operated while the intermediate member 90 is retained in the position closer to the retracted position of the rotation base 25 together with the first slide base 44, so that the seat body 10 is retracted with respect to the vertically moving base 85 of the four-joints link mechanisms 84. As a result, as illustrated in FIG. 5, the hook 72 of the engagement member 70 of the seat body 10 passes below the first receiving portion 92 of the intermediate member 90 in the position closer to the retracted position. Further, when the seat body 10 is retracted to the retracted position with respect to the four-joints link mechanisms 84, the first slide base 44 is then retracted from the position closer to the retracted position of the rotation base 25 to the retracted position thereof. As a result, the intermediate member 90 and the seat body 10 are retracted from the positions closer to the retracted positions of the rotation base 25 to the retracted positions thereof. Further, as illustrated in FIGS. 3 and 4, as the seat body 10 is retracted, the hook 72 of the engagement member 70 is pushed onto the inclined guide surface 77f of the guide portion 77 against the spring force of the coil spring 73, so as to be rotated to the horizontal upper limit position (the restraint position). As a result, the hook portion 72k of the hook 72 of the engagement member 70 is retained at the restraint position in which the hook portion 72k faces the first receiving portion 92 of the intermediate member 90 in the advancing-retracting direction.

Further, the seat body 10 is returned from the laterally facing position in which the seat body 10 faces the door opening to the seating position in which the seat body 10 faces the front side of the vehicle by the rotation mechanism 20 and the longitudinal slide mechanism 30. In this condition, the second receiving portion 94 of the intermediate member 90 is positioned directly below the engagement portion 64e of the slide engagement member 64 with intervening the clearance therebetween.

As a result, when the front-end collision of the vehicle happens in the condition that the seat body 10 is in the seating position in which the seat body 10 faces the front side of the vehicle, and the seat body 10 moves horizontally forwardly by the seatbelt loading, the hook 72 of the engagement member 70 of the seat body 10 reliably engages the first receiving portion 92 of the intermediate member 90 that is integrated with the first slide base 44, so that the seat body 10 can be retained on the rotation base 20. Further, the intermediate member 90 is pulled forwardly-upwardly by the seat body 10 to move forwardly-upwardly, so that the openings 94h of the second receiving portion 94 of the intermediate member 90 engage the engagement teeth 64k of the engagement portion 64e of the slide engagement member 64. As a result, the seat body 10 is retained on the vehicle floor F via the engagement member 70, the intermediate member 90 and the slide engagement member 64.

<Regarding Advantages of Vehicle Seat 1]

According to the present invention, when the seat body 10 moves to the retracted position with respect to the four-joints link mechanisms 84, and the first slide base 44 is retracted to the retracted position with respect to the rotation base 25, the engagement member 70 attached to the seat body 10 is moved to the restraint position by the guide portion 77 disposed on the rotation base 25. That is, the engagement member 70 of the seat body 10 is moved to the restraint position, so that the engagement member 70 faces the first receiving portion 92 of the intermediate member 90 integrated with the first slide base 44 in the advancing-retracting direction. Thus, even when the seat body 10 moves horizontally forwardly by the seatbelt loading, the engagement member 70 of the seat body 10 can reliably engage the first receiving portion 92 of the intermediate member 90 integrated with the first slide base 44, so that the seat body can be retained on the rotation base 25.

Further, when the seat body 10 is advanced from the retracted position, the engagement member 70 of the seat body 10 is moved to the restraint release position by the guide portion 77 disposed on the rotation base 25. As a result, the hook 72 of the engagement member 70 is retracted to a position in which the hook 72 does not face the first receiving portion 92 of the intermediate member 90 in the advancing-retracting direction. As a result, the engagement member 70 of the seat body 10 and the first receiving portion 92 of the intermediate member 90 of the first slide base 44 do not preclude the seat body 10 from being advanced by the first slide mechanism 40 and the second slide mechanism 50. That is, when the seat body 10 is slid, sliding movement of the seat 10 cannot be precluded even if a special operation is not performed.

Further, according to this embodiment, when the seat body 10 is moved to an exterior position, as the intermediate member 90 and the seat body 10 are advanced from the retracted positions to the positions closer to the retracted positions with respect to the rotation base 25 by the first slide base 44, the hook 72 of the engagement member 70 of the seat body 10 moves to the restraint release position. Further, when the seat body 10 is moved to the interior position, as the intermediate member 90 and the seat body 10 are retracted from the positions closer to the retracted positions to the retracted positions with respect to the rotation base 25 by the first slide base 44, the hook 72 of the engagement member 70 of the seat body 10 moves to the restraint position.

In this way, the engagement member 70 of the seat body 10 can be moved between the restraint position and the restraint release position while the intermediate member 90 and the engagement member 70 of the seat body 10 are maintained in a predetermined longitudinal positional relationship. Therefore, adjustment among the engagement member 70, the intermediate member 90 and the guide portion 77 is facilitated.

<Modified Forms of Vehicle Seat 1>

The present invention is not limited to the embodiment described above and the invention can be modified without departing from the scope thereof. For example, in this embodiment, the intermediate member 90 (the engaged member) is attached to the outer link arm 84b of the four-joints link mechanism 84, so as to be integrated with the first slide base 44 in the advancing-retracting direction. However, the intermediate member 90 can be attached to the first slide base 44 using a support member or other such members.

Further, in this embodiment, the first slide base 44 is temporarily stopped in the position closer to the retracted position with respect to the rotation base 25. Thereafter, the seat body 10 is retracted to the retracted position with respect to the four-joints link mechanisms 84. Finally, the first slide base 44 is retracted from the position closer to the retracted position to the retracted position. However, the seat body 10 can be retracted to the retracted position with respect to the four-joints link mechanisms 84 after the first slide base 44 is completely retracted to the retracted position with respect to the rotation base 25.

Further, in the embodiment, the first receiving portion 92 that is engageable with the hook 72 of the engagement member 70 is formed at the upper end of the intermediate member 90. Conversely, the second receiving portion 94 that is engageable with the engagement portion 64e of the slide engagement member 64 is formed at the lower end of the intermediate member 90. However, the first receiving portion 92 and the second receiving portion 94 can be formed as separate members.

Further, in the embodiment, the engagement member 70, the intermediate member 90 and the slide engagement member 64 are positioned on a right side of the seat body 10. However, these members 70, 90 and 64 can be positioned on a left side of the seat body 10.

Further, in the embodiment, the passenger seat of the vehicle is exemplified as the vehicle seat 1. However, the present invention can be applied to seats other than the passenger seat.

Embodiment 2

Figure 6:
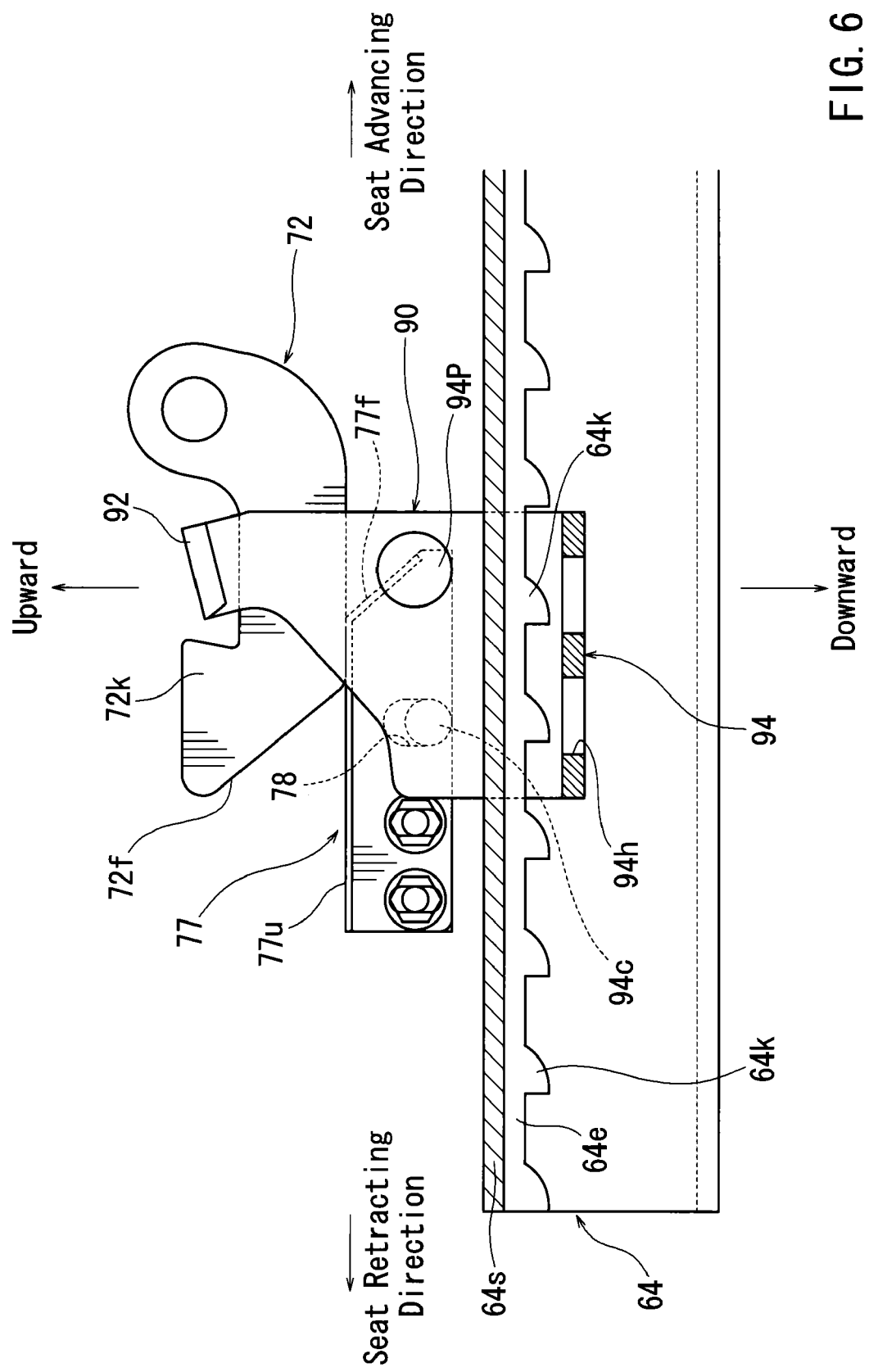
FIG. 6 is an enlarged side view which illustrates the operation of the slide lock mechanism.
Figure 7:
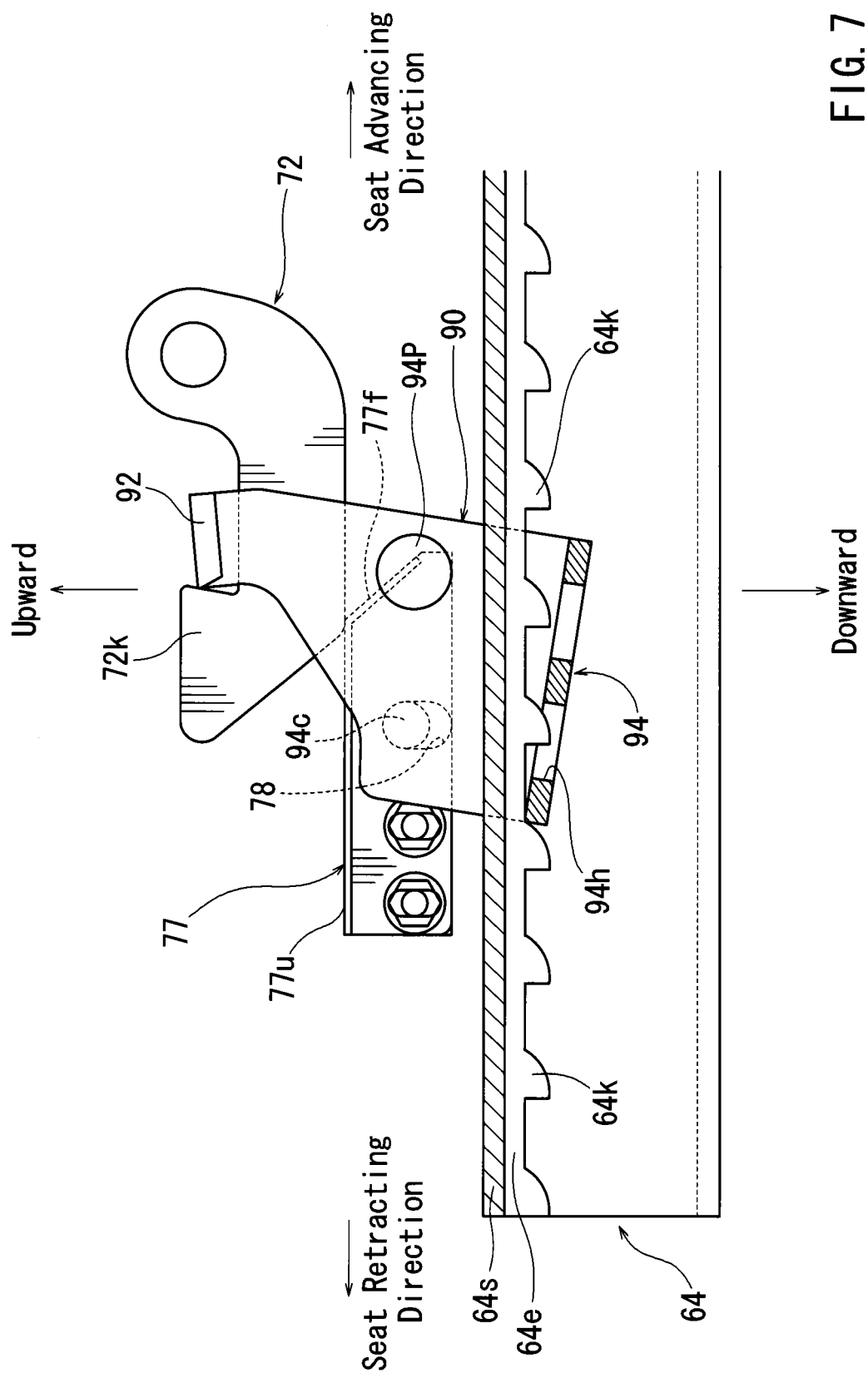
FIG. 7 is an enlarged side view which illustrates the operation of the slide lock mechanism.

In the following, the vehicle seat according to Embodiment 2 of the present invention will be described with reference to, for example, FIGS. 6 and 7. In a vehicle seat of this embodiment, the intermediate member 90 constituting the slide lock mechanism 60 of the vehicle seat of Embodiment 1 is improved. However, the vehicle seat of this embodiment has the same construction as the vehicle seat of Embodiment 1. Therefore, elements that are the same as those of the vehicle seat of Embodiment 1 will be identified by the same reference numerals and a description thereof is omitted. Further, FIGS. 6 and 7 are enlarged side views each of which illustrates the operation of the slide lock mechanism.

<Regarding Intermediate Member 90>

The intermediate member 90 of this embodiment is modified from the intermediate member 90 as described in Embodiment 1. That is, the intermediate member 90 of this embodiment is constructed so as to be rotated upwardly (clockwise in FIG. 6) by a predetermined angle from a horizontal position.

A front portion of the intermediate member 90 is vertically rotatably connected to a bracket (not shown) of the outer link arm 84b via a support shaft 94p at a vertically central position thereof. Further, a rotation restraint pin 94c is attached to a rear portion of the intermediate member 90. The rotation restraint pin 94c is positioned at the substantially same height as said support shaft 94p. The rotation restraint pin 94c is a pin for limiting a rotation range of the intermediate member 90 and is inserted into a vertically elongated hole 78 (shown by broken lines) that is formed in said bracket of the outer link arm 84b. As a result, the intermediate member 90 is capable of vertically rotating about the support shaft 94p within the range in which the rotation restraint pin 94c can move in the vertically elongated hole 78. That is, a condition in which the rotation restraint pin 94c contacts a lower end of the vertically elongated hole 78 (FIG. 6) corresponds to a lower limit position (a horizontal position) of the intermediate member 90. Conversely, a condition in which the rotation restraint pin 94c contacts an upper end of the vertically elongated hole 78 (FIG. 7) corresponds to an upper limit position (a forwardly inclined position) of the intermediate member 90. Further, provided between the intermediate member 90 and said bracket of the outer link arm 84b is a spring member (not shown) that is capable of retaining the intermediate member 90 in said horizontal position. Thus, the intermediate member 90 is normally maintained in the horizontal position by a spring force of said spring member.

<Regarding Operation of Intermediate Member 90>

When the front-end collision of the vehicle happens in the condition that the seat body 10 is in the seating position in which the seat body 10 faces the front side of the vehicle, and the seat body 10 moves horizontally forwardly by the seatbelt loading, the hook 72 of the engagement member 70 of the seat body 10 reliably engages the first receiving portion 92 of the intermediate member 90 that is integrated with the first slide base 44, so that the seat body 10 can be retained on the rotation base 20. Further, the intermediate member 90 is pulled forwardly by the hook 72 of the engagement member 70. As a result, as illustrated in FIG. 7, the intermediate member 90 is rotated upwardly (clockwise) about the support shaft 94$p$ against the spring force of the spring member. That is, the intermediate member 90 moves from the horizontal position to the forwardly inclined position. As a result, the openings 94$h$ of the second receiving portion 94 of the intermediate member 90 engage the engagement teeth 64$k$ of the engagement portion 64$e$ of the slide engagement member 64. Thus, the seat body 10 is retained on the vehicle floor F via the engagement member 70, the intermediate member 90 and the slide engagement member 64.

That is, the horizontal position of the intermediate member 90 corresponds to the restraint release position of the present invention. Further, the forwardly inclined position of the intermediate member 90 corresponds to the restraint position of the present invention.

<Regarding Advantages of Vehicle Seat 1>

According to the present invention, the intermediate member 90 moves to the restraint position (the forwardly inclined position) by a force transmitted from the engagement member 70 of the seat body 10. As a result, the second receiving portion 94 of the intermediate member 90 engages the slide engagement member 64, so that a force to urge the seat body 10 to move forwardly or forwardly-upwardly can be transmitted to the vehicle floor F.

That is, even when the seat body 10 moves horizontally forwardly, the engagement member 70 of the seat body 10 engages the first receiving portion 92 of the intermediate member 90. As a result, the intermediate member 90 moves to the restraint position (the forwardly inclined position), so that the second receiving portion 94 of the intermediate member 90 engages the slide engagement member 64 of the vehicle floor F. Thus, even when the seat body 10 moves horizontally forwardly with respect to the vehicle floor F by the seatbelt loading, the lock mechanism reliably functions, so that the seat body 10 can be retained on the vehicle floor F. Further, the engagement member 70 of the seat body 10 does not normally preclude the seat body 10 from being advanced and retracted with respect to the four-joints link mechanisms 84. Further, the intermediate member 90 does not normally preclude the seat body 10, the second slide mechanism 50 and the vertically moving mechanism 80 from rotating with respect to the vehicle floor F. Also, the intermediate member 90 does not normally preclude the first slide base 44 from being advanced and retracted with respect to the rotation base 25. That is, when the seat body 10 is rotated and vertically slid, rotational movement and sliding movement of the seat body 10 cannot be precluded even if a special operation is not performed.

<Modifications of Vehicle Seat 1>

The present invention is not limited to the embodiment described above and the invention can be modified without departing from the scope thereof. For example, in this embodiment, the intermediate member 90 is rotated upwardly (clockwise) about the support shaft 94$p$, so that the intermediate member 90 is moved from the horizontal position (the restraint release position) to the forwardly inclined position (restraint position). However, the intermediate member 90 can be constructed to be moved from the restraint release position to the restraint position using a guide member or other such members. Further, in the embodiment, the engagement member 70, the intermediate member 90 and the slide engagement member 64 are positioned on a right side of the seat body 10. However, these members 70, 90 and 64 can be positioned on a left side of the seat body 10.

The invention claimed is:

1. A vehicle seat comprising:
a seat body;
a rotation mechanism having a rotation base that is capable of rotating along a vehicle floor;
a vertically moving mechanism having a first slide mechanism, a link mechanism and a guide mechanism, wherein the first slide mechanism is disposed on said rotation base and having a slide base that is capable of being advanced or retracted, wherein one end of the link mechanism is vertically rotatably connected to said slide base, and wherein the guide mechanism is capable of guiding said link mechanism so as to vertically move the other end of said link mechanism as said slide base advances or retracts; and
a second slide mechanism that supports the seat body on the other end of said link mechanism so as to be capable of being advanced and retracted,
wherein said seat body is capable of being lowered by said vertically moving mechanism so as to be moved from an interior position to an exterior position after the seat body is rotated from a seating position in which the seat body faces a front side of a vehicle to a laterally facing position in which the seat body faces a door opening by said rotation mechanism and is then advanced toward a vehicle exterior by said second slide mechanism, and wherein said seat body is capable of being moved from the exterior position to the interior position by performing a reverse operation,
the vehicle seat further comprising:
an engaged member that is integrated with said slide base in an advancing-retracting direction;
an engagement member that is provided on said seat body so as to be movable between a restraint position and a restraint release position, wherein when said seat body is in a retracted position with respect to said link mechanism, the engagement member is capable of moving to said restraint position, so as to be advanced to a position in which the engagement member faces said engaged member from below and from a retracting direction with respect to said link mechanism of said seat body, and is capable of moving to said restraint release position, so as to be retracted to a position in which the engagement member does not face said engaged member in the advancing-retracting direction with respect to said link mechanism of said seat body; and
a guide portion that is disposed on the rotation base, wherein the guide portion is capable of moving said engagement member to said restraint position when said seat body moves to the retracted position with respect to said link mechanism and said slide base is retracted to a retracted position with respect to said rotation base, and is capable of moving said engagement member to said restraint release position when said seat body is advanced from the retracted position with respect to said link mechanism or said slide base is advanced from the retracted position with respect to said rotation base.

2. A vehicle seat as defined in claim 1, wherein in order to move said seat body to the exterior position, prior to advancing motion of said seat body with respect to said link mechanism, said slide base is advanced from the retracted position to a position closer to the retracted position with respect to said rotation base, thereby moving said engagement member to said restraint release position, and wherein in order to move said seat body to the interior position, said slide base is temporarily stopped immediately before the slide base reaches the retracted position with respect to said rotation base, and said seat body is retracted to the retracted position with respect to said link mechanism, and then said slide base is retracted to the retracted position with respect to said rotation base, thereby moving said engagement member to said restraint position.

3. A vehicle seat comprising:
a seat body;
a rotation mechanism having a rotation table that is capable of rotating along a vehicle floor;
a vertically moving mechanism having a first slide mechanism, a link mechanism and a guide mechanism, wherein the first slide mechanism is disposed on said rotation table and having a slide base that is capable of being advanced or retracted, wherein one end of the link mechanism is vertically rotatably connected to said slide base, and wherein the guide mechanism is capable of guiding said link mechanism so as to vertically move the other end of said link mechanism as said slide base advances or retracts; and
a second slide mechanism that supports the seat body on the other end of said link mechanism so as to be capable of being advanced and retracted,
wherein said seat body is capable of being lowered by said vertically moving mechanism so as to be moved from an interior position to an exterior position after the seat body is rotated from a seating position in which the seat body faces a front side of a vehicle to a laterally facing position in which the seat body faces a door opening by said rotation mechanism and is then advanced toward a vehicle exterior by said second slide mechanism, and wherein said seat body is capable of being moved from the exterior position to the interior position by performing a reverse operation,
the vehicle seat further comprising:
an engagement member connected to said seat body;
a slide engagement member connected to the vehicle floor; and
an intermediate member having a first receiving portion and a second receiving portion, wherein the intermediate member is constructed so as to be incapable of moving relative to said slide base in an advancing-retracting direction and to be capable of moving between a restraint position and a restraint release position, and wherein the intermediate member is capable of moving to the restraint position when a force directed forwardly or forwardly-upwardly is applied to said first receiving portion,
wherein said engagement member is constructed to normally not preclude said seat body from being advanced and retracted with respect to said link mechanism,
wherein the engagement member is constructed to engage the first receiving portion of said intermediate member when said seat body moves forwardly or forwardly-upwardly with respect to said slide base upon front-end collision of the vehicle in a condition that said seat body is in the interior position, thereby transmitting a force to urge said seat body to further move to the intermediate member,
wherein said intermediate member is constructed to normally not preclude said seat body, the second slide mechanism and the vertically moving mechanism from rotating with respect to the vehicle floor, and to normally not preclude said slide base from being advanced and retracted with respect to said rotation base, and
wherein the intermediate member is also constructed such that said second receiving portion engages said slide engagement member when the intermediate member moves to said restraint position by a force transmitted from said engagement member upon the front-end collision of the vehicle in a condition that said seat body is in the interior position, thereby transmitting the force to urge the seat body to move forwardly or forwardly-upwardly to the vehicle floor.

* * * * *